United States Patent
Da Silva et al.

(10) Patent No.: US 11,570,669 B2
(45) Date of Patent: *Jan. 31, 2023

(54) RADIO NETWORK NODE, WIRELESS DEVICE, AND METHODS FOR PERFORMED IN A WIRELESS COMMUNICATION NETWORK

(71) Applicant: Telefonaktiebolaget LM Ericsson (publ), Stockholm (SE)

(72) Inventors: Icaro L. J. Da Silva, Solna (SE); Patrik Rugeland, Stockholm (SE); Johan Rune, Lidingö (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/108,637

(22) Filed: Dec. 1, 2020

(65) Prior Publication Data

US 2021/0084550 A1    Mar. 18, 2021

Related U.S. Application Data

(63) Continuation of application No. 16/605,560, filed as application No. PCT/SE2018/050491 on May 14, 2018, now Pat. No. 10,887,803.

(Continued)

(51) Int. Cl.
 *H04W 36/00* (2009.01)
 *H04W 74/00* (2009.01)
 *H04W 74/08* (2009.01)

(52) U.S. Cl.
 CPC .... *H04W 36/0072* (2013.01); *H04W 36/0079* (2018.08); *H04W 74/004* (2013.01); *H04W 74/0833* (2013.01)

(58) Field of Classification Search
 CPC ......... H04W 74/0833; H04W 36/0072; H04W 72/042
 See application file for complete search history.

(56) References Cited

U.S. PATENT DOCUMENTS 9,107,173 B2    8/2015   Gao et al.
10,966,271 B2 *  3/2021  Kaasalainen ........ H04B 7/0617
(Continued)

OTHER PUBLICATIONS

EPO Communication dated Oct. 8, 2021 for Patent Application No. 18799166.6, consisting of 7-pages.
(Continued)

*Primary Examiner* — Michael T Vu
(74) *Attorney, Agent, or Firm* — Christopher & Weisberg, P.A.

(57) ABSTRACT

Embodiments herein relate, for example, to operations performed by a network node for handling communication of a wireless device in a wireless communication network. The network node receives a first preamble associated with a first downlink ("DL") beam from the wireless device. The network node transmits a random access response ("RAR") to the wireless device using the first DL beam associated with the first preamble. Responsive to transmitting the RAR using the first DL beam, the network node determines that the wireless device has not received the RAR. Responsive to determining that the wireless device has not received the RAR, the network node transmits the RAR using a second DL beam.

20 Claims, 18 Drawing Sheets

Related U.S. Application Data

(60) Provisional application No. 62/505,145, filed on May 12, 2017.

(56) References Cited

U.S. PATENT DOCUMENTS

| | | | | |
|---|---|---|---|---|
| 11,178,696 | B2* | 11/2021 | Kim | H04W 74/0891 |
| 2017/0207843 | A1 | 7/2017 | Jung et al. | |
| 2017/0223744 | A1* | 8/2017 | Qian | H04W 74/0833 |
| 2018/0092129 | A1* | 3/2018 | Guo | H04W 56/0005 |
| 2019/0281639 | A1 | 9/2019 | Fang et al. | |

OTHER PUBLICATIONS

3GPP TSG RAN WG1 NR Ad-Hoc Meeting R1-1700548; Title: Discussion on Random Access Procedure for NR; Agenda Item: 5.1.1.4.2; Source: Guangdong OPPO Mobile Telecom; Document for: Discussion and Decision; Date and Location: Jan. 16-20, 2017, Spokane, USA, consisting of 3-pages.

3GPP TSG-RAN WG2 Meeting #97bis R2-1702957; Title: Discussion on RAR reception for eMTC; Agenda Item: 7.3; Source: Huawei, HiSilicon; Document for: Discussion and Decision; Date and Location: Apr. 3-7, 2017, Spokane, Washington, USA, consisting of 4-pages.

International Search Report and Written Opinion of the International Searching Authority for PCT International Application No. PCT/SE2018/050491, dated Sep. 6, 2018, 11 pages.

Sony, "Remaining Issues on 4-step RA CH Procedure", 3GPP TSG RAN WG1 Meeting #89 Hangzhou, P.R. China, May 15-19, 2017, R1-1708252, 4 Pages.

Ericsson, "Handover command and CSI-RS configuration of target", 3GPP TSG-RAN WG2 #98, Hangzhou, China, May 15-19, 2017, Tdoc R2-1704085, 3 Pages.

Spreadtrum Communications, "Discussion on beam refinement", 3GPP TSG RAN WGl meeting #89 Hangzhou, China May 15-19, 2017, R1-1707787, 4 Pages.

European Search Report and Written Opinion for European Patent Application No. EP 18799166, dated Mar. 17, 2020, 4 pages.

Ericsson, "NR random-access response design", 3GPP TSG-RAN WG1 Meeting #89 Hangzhou, China, May 15-19, 2017, R1-1708731, XP051263298, 8 Pages.

Indian Office Action dated Nov. 24, 2021 for Patent Application No. 201947045010, consisting of 6-pages.

* cited by examiner

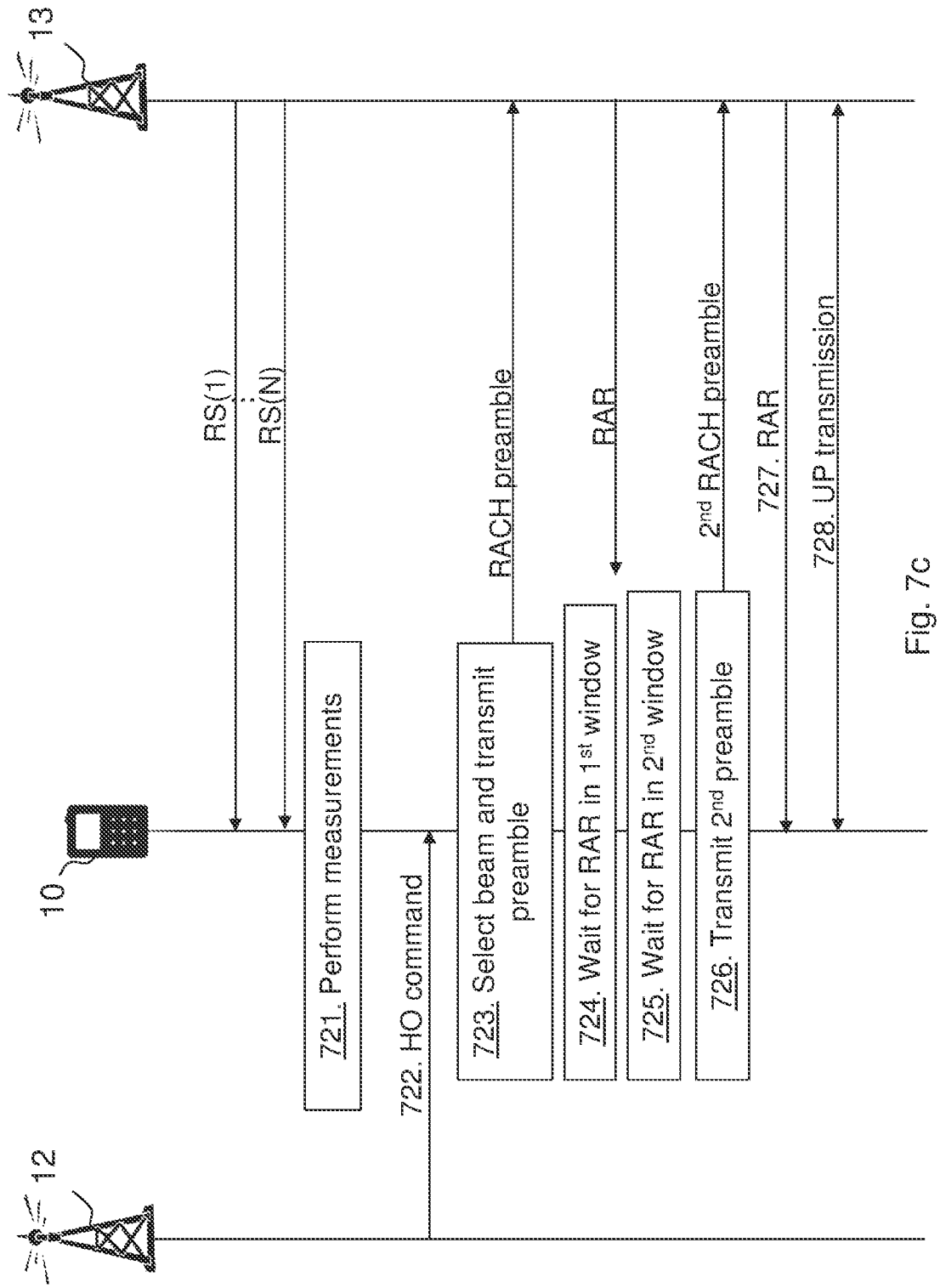

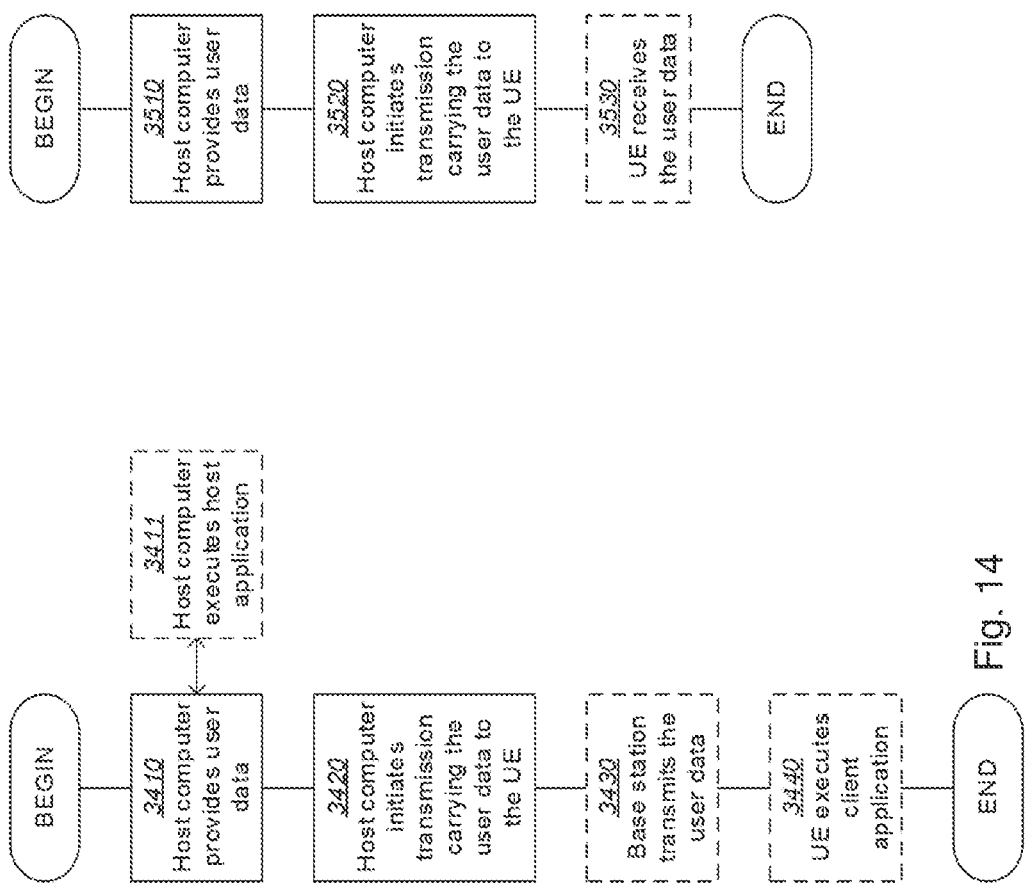

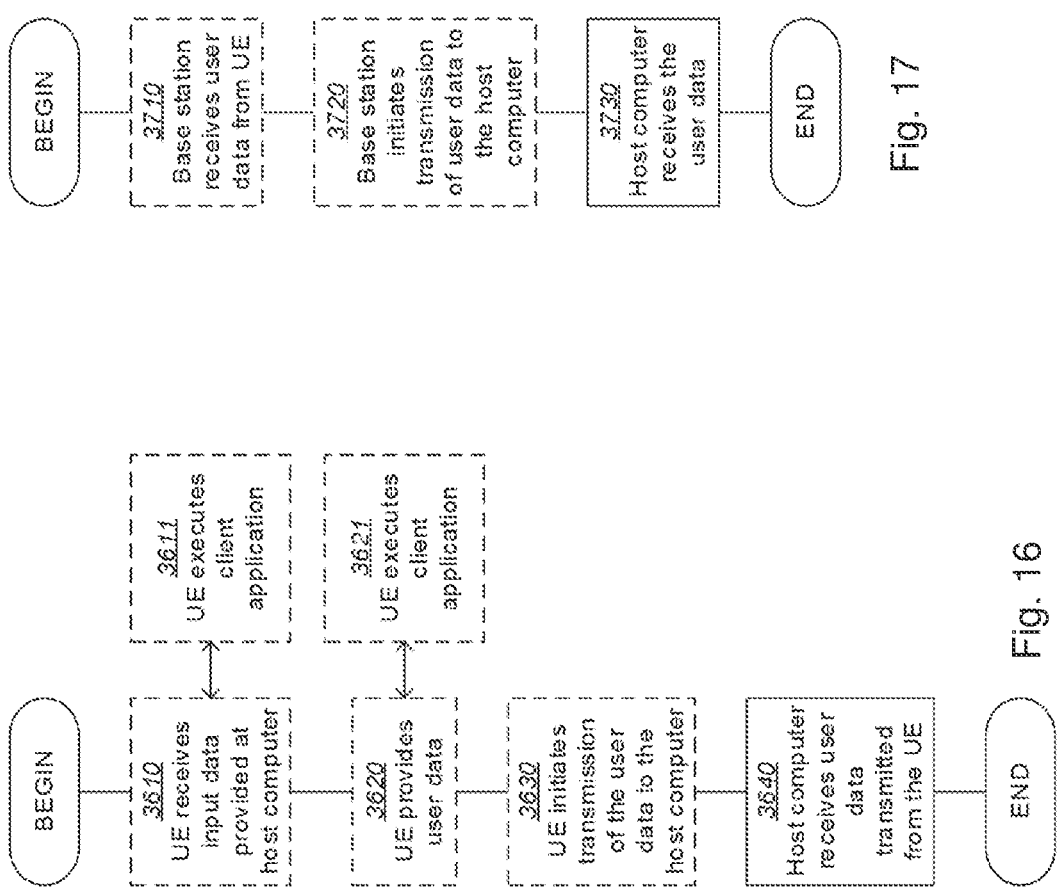

RADIO NETWORK NODE, WIRELESS DEVICE, AND METHODS FOR PERFORMED IN A WIRELESS COMMUNICATION NETWORK

CROSS REFERENCE TO RELATED APPLICATIONS

This application is a continuation of U.S. patent application Ser. No. 16/605,560 filed Oct. 16, 2019, which is a 35 U.S.C. § 371 national stage application of PCT International Application No. PCT/SE2018/050491 filed on May 14, 2018, which in turns claims domestic priority to U.S. Provisional Patent Application No. 62/505,145, filed on May 12, 2017, the disclosures and content of which are incorporated by reference herein in their entirety.

TECHNICAL FIELD

Embodiments herein relate to a radio network node, a wireless device and methods performed therein regarding wireless communication. Furthermore, a computer program product and a computer-readable storage medium are also provided herein. In particular, embodiments herein relate to handling communication of the wireless device in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some networks may also be called, for example, a NodeB, a eNodeB, or gNodeB. The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

In LTE, a connected wireless device is configured to perform Radio Resource Management (RRM) measurements and report them based on events that can be triggered. Network is assisted by these reports to take decisions whether the connection should be moved from one cell to another. If a decision is made, the radio network node sends a handover command to the wireless device, i.e. an RRC-ConnectionReconfiguration message with the mobilityControlInformation IE which contains, among other information, the necessary information to access the target cell, such as the Random Access Channel (RACH) configuration, i.e. time and frequency resources for the Physical Random Access Channel (PRACH) and possibly a dedicated random access preamble.

In NR, it has been agreed that the same principles should follow i.e. the handover should contain all the necessary information that enables the wireless device to access the target cell. In other words, the wireless device also needs to have the RACH configuration, i.e. time and frequency resources for the PRACH and possibly a dedicated preamble. However, differently from LTE, the random access procedure and PRACH in NR will have a design that enables the network to:

Use analog beamforming at the Reception (RX) side to improve the PRACH detection;

By the preamble detection the radio network node is able to know the best DL beam to at least transmit a random access response (RAR).

As a consequence of these, the random access procedures in NR can be assumed to have the following characteristics:

The wireless device should be able to detect a DL beam in the cell the wireless device should access, either during a handover, in which case the accessed cell is a target cell, or initial access, in which case the accessed cell is the cell the wireless device is camping on;

To enable analog RX beamforming when receiving the random access preamble, on the PRACH, in the radio network node such as the gNB, there should be a mapping between that DL beam, or groups of DL beams, and the RACH configuration, i.e. time/frequency resources and optionally preamble subset, so analog beamforming can listen in the correct directions in the right time to receive UL transmissions on the PRACH.

In NR, there is currently a discussion for the specific structure of the synchronization signals (SS) and reference signals (RS) to support procedures such as random access, which is necessary during handovers and transitions from idle to connected state. It is herein described how a wireless device would access a target cell in RRC_CONNECTED state in NR under current assumptions/agreements in the TSG-RAN Working Group 1 (RAN1) and TSG-RAN Working Group 2 (RAN2) in 3GPP.

A combination of NR synchronization sequences e.g. NR-Primary Synchronization Signal (PSS)/Secondary Synchronization Signal (SSS), and Physical Broadcast Channel (PBCH) may constitute a so called SS Block. That may also contain a Tertiary Sync Signal (TSS) to indicate the Orthogonal Frequency-Division Multiplexing (OFDM) symbol timing or equivalent information, but the TSS is still For Further Study (FFS) in WG RAN1. An RRC_CONNECTED wireless device trying to access a target cell may assume that the SS Block may be transmitted in the form of repetitive bursts of SS Block transmissions, denoted "SS Burst", wherein such a SS burst consists of a number of SS Block transmissions following close, i.e. within a timer interval, after each other in time. Furthermore, a set of SS Bursts may be grouped together, denoted "SS Burst Set", where the SS Bursts in the SS Burst Sets are assumed to have some relation to each other, e.g. that the SS Block transmissions in the SS Burst Set together forms a complete beam sweep, covering the entire intended coverage area. Both SS Bursts and SS Burst Sets have their respective given periodicity. In the single beam scenarios, the network could configure time-repetition within one SS Burst in a wide beam. In multi-beam scenarios, at least some of these signals and physical channels, e.g. SS Block, may be transmitted in multiple beams, which could be done in different manners depending on network implementation, as shown in FIG. 1.

FIG. 1 shows examples of different configurations of an SS Burst Set. Top: Time-repetition within one SS Burst in a wide beam. Middle: Beam-sweeping of a small number of beams using only one SS Burst in the SS Burst Set. Bottom: Beam-sweeping of a larger number of beams using more than one SS Burst in the SS Burst Set to form a complete sweep. To implement which of these three alternatives is a network vendor choice. That choice depends on the tradeoff between i) the overhead caused by transmitting periodic and always on narrow beam sweepings vs. ii) the delays and signaling needed to configure the wireless device to find a narrow beam for Physical Downlink Shared Channel (PDSCH) and Physical Downlink Control Channel (PDCCH). The implementation shown in the upper figure prioritizes i), while the implementation shown in the bottom figure prioritizes ii). The figure in the middle case is an intermediate case, where a sweeping of wide beams is used. In that case the number of beams to cover the cell is reduced, but in some cases an additional refinement is needed for narrow gain beamforming of PDSCH.

Let us now assume the different beamforming implementations for the SS Block transmissions in the case of handovers and assume that the target cell implements one of these alternatives.

In the case on top, where a single beam transmits the SS Burst Set, the handover command contains a single RACH configuration for the target cell. Once the wireless device receives the handover command it will access the target and a random access procedure will be triggered by the wireless device sending a random access preamble. Unless directional reciprocity is assumed in the radio network node, such as a Transmission and Reception Point (TRP) or gNB, receiving the preamble, the target cell will transmit the random access response (RAR) either by sweeping beams in all directions until the wireless device detects and transmits a handover (HO) complete message, or something equivalent to notify that the handover has been completed at the wireless device, or transmitting the RAR with time repetition in a wider beam and expect the HO complete message. In any of these cases, after the handover, depending on the data rates/service, the desired wireless device performance requires that the target cell triggers a beam management operation of beam refinement, enabling the wireless device to use a narrow beam for PDCCH and PDSCH in the target cell. That may require an additional configuration, using Radio Resource Control (RRC) and/or Layer one and Layer two (L1/L2) signaling, additional measurement and reporting mechanisms and additional delay to perform measurements in the target cell e.g. based on Channel State Information-Reference Signal (CSI-RS) processes configured for beam management. In other words, after the handover, it may take some time until the wireless device again can access a narrow beam in the target cell, so it may take some time until the target cell can start to beamform PDSCH with high gain enabling high data rates.

In the bottom case, where multiple narrow beams are used to transmit the SS Burst Set, the handover command may contain multiple RACH configurations for the target cell, possibly associated with the SS Block beams or groups of SS Block beams from target cell. Once the wireless device receives the handover command it will select a beam in the target cell, check how it maps to the received RACH configuration per beam and initiate a random access procedure by sending a random access preamble associated with a target cell, beam or a group of beams, using the PRACH resources associated with the target cell, beam or group of beams. A possible mapping is shown in FIG. 2. FIG. 2 shows an example where each SS Block contains a mapping between RACH configuration and the strongest DL beam transmitting the SS Block. In this example, each PRACH occasion or resource is associated with two SS Block beams. Even without directional reciprocity in the radio network node, the implementation enables the target cell to transmit the RAR in the strongest DL beam covering the wireless device thanks to the mapping between RACH configuration (including the preamble) and the target cell DL beam. That allows the wireless device to quickly access a narrow beam in the target right after handover execution. Despite its benefit, such a solution has disadvantages in the form of rather high overhead and access latency, especially considering the following facts:

1) Most of the time when the sweeping of narrow beams of the SS Burst is being used, handovers are not even occurring. Hence, using the solution to enable a quick access to narrow beams in a target cell may be too costly without clear benefits in some cases.

2) In many cases, handovers would not really require an incoming wireless device to rely on a narrow gain beam in the target. In some cases, when the wireless device uses a low data rate service or is not even continuously transmitting data and then a wide beam access in the target could be sufficient. Hence, the overhead would not be needed in some handovers.

The middle case, where beam sweeping is considered but wide beams are used to reduce the overhead, is an attempt to find a compromise between overhead and quick access to a beam. However, the solution does also not consider the previously described facts 1) and 2) since it is a static configuration. In other words, although the solution tries to enable the wireless device to access a DL beam at the target after handover execution, in some cases where the wireless device requires a refined DL beam, additional steps will anyway be needed in the target for beam refinement.

In summary, defining as narrow beams as possible in the SS Burst Set, as shown at the bottom of FIG. 1, speeds up the wireless device access to a very narrow beam. On the other hand, the cost for that is the transmission of periodic beam sweepings of the SS Blocks in narrow beams, which may represent a significant overhead considering that it might mainly be useful these periods when the network, e.g. a neighboring gNB considers a handover into the cell for a wireless device. During initial access, one could claim that data connectivity has not yet started, hence, the wireless device may afford to start with a wide DL beam transmission until the network configures a set of CSI-RS processes for beam refinement i.e. selection within the wide beam for higher data rates. However, in the case of handovers, a wireless device might already have a high data rate service in the serving cell so that a handover to a wide beam and then perform beam refinement may represent a non-seamless handover at least for some services.

FIG. 1 shows an example of a handover execution followed by beam refinement. That step of beam refinement may anyway be necessary in the case of wide beam sweeping transmissions or repetition of the SS Block. Handing over to a target cell may fail when using beamforming leading to a reduced or limited performance of the wireless communication network.

SUMMARY

An object of embodiments herein is to provide a mechanism that improves performance of the wireless communication network when handling communication, e.g. handling handover of a wireless device, for wireless devices in a wireless communication network.

According to an aspect the object is achieved by providing a method performed by a wireless device for handling communication in a wireless communication network. The wireless device transmits to a radio network node, a first preamble associated with a selected DL beam. The wireless device further monitors for a RAR in a first RAR reception window and when the RAR is not received in the first RAR reception window, the wireless device monitors for the RAR in a second RAR reception window of a different beam; or the wireless device transmits, to the radio network node, a second preamble associated with a second beam wherein the first preamble is associated with a channel state information reference signal and the second preamble is associated with a synchronization signal block.

According to another aspect the object is achieved by providing a method performed by a radio network node for handling communication of a wireless device in a wireless communication network. The radio network node receives a first preamble associated with a DL beam, e.g. a preamble mapped to a certain beam. The radio network node further transmits a RAR using the DL beam associated with the first preamble. The radio network node further detects whether the wireless device has successfully received the RAR or not. The radio network node further sends the RAR a second time using a different beam when detected that the wireless device 10 has not successfully received the RAR, wherein the different beam covers the DL beam the wireless device has initially selected.

It is furthermore provided herein a computer program product comprising instructions, which, when executed on at least one processor, cause the at least one processor to carry out any of the methods above, as performed by the wireless device or the radio network node. It is additionally provided herein a computer-readable storage medium, having stored thereon a computer program product comprising instructions which, when executed on at least one processor, cause the at least one processor to carry out the method according to any of the methods above, as performed by the wireless device or the radio network node.

According to yet another aspect the object is achieved by providing a wireless device for handling communication in a wireless communication network. The wireless device is configured to transmit, to a radio network node, a first preamble associated with a selected downlink beam. The wireless device is further configured to monitor for a RAR in a first RAR reception window; and when the RAR is not received in the first RAR reception window, the wireless device is configured to monitor for the RAR in a second RAR reception window of a different beam; or to transmit, to the radio network node, a second preamble associated with a second beam wherein the first preamble is associated with a channel state information reference signal and the second preamble is associated with a synchronization signal block.

According to still another aspect the object is achieved by providing a radio network node for handling communication of a wireless device in a wireless communication network. The radio network node is configured to receive a first preamble associated with a DL beam and transmit a RAR using the DL beam associated with the first preamble. The radio network node is further configured to detect whether the wireless device has successfully received the RAR or not; and to send the RAR a second time using a different beam when detected that the wireless device has not successfully received the RAR, wherein the different beam covers the DL beam the wireless device has initially selected.

According to yet another aspect the object is achieved by providing a wireless device comprising processing circuitry configured to transmit, to a radio network node, a first preamble associated with a selected downlink beam. The processing circuitry is further configured to monitor for a RAR in a first RAR reception window; and when the RAR is not received in the first RAR reception window, the processing circuitry is configured to monitor for the RAR in a second RAR reception window of a different beam; or to transmit, to the radio network node, a second preamble associated with a second beam wherein the first preamble is associated with a channel state information reference signal and the second preamble is associated with a synchronization signal block.

According to still another aspect the object is achieved by providing a radio network node comprising processing circuitry configured to receive a first preamble associated with a DL beam and transmit a RAR using the DL beam associated with the first preamble. The processing circuitry is further configured to detect whether the wireless device has successfully received the RAR or not; and to send the RAR a second time using a different beam when detected that the wireless device has not successfully received the RAR, wherein the different beam covers the DL beam the wireless device has initially selected.

The solution enables the wireless device and network to identify potential error cases when a beam selection, e.g. narrow beam selection, is performed combined with a handover (and/or a transition from inactive to connected state based on a narrow DL beam and/or addition of a connectivity leg to establish dual connectivity or multi-connectivity or to add a component carrier for carrier aggregation) and perform fallback to the second beam, such as a wide beam, when some kind of failure in the RAR reception is detected. One advantage is that one can use e.g. wide beams for static signals, use narrow beams for dynamic beamforming and, in the case of failures caused by the narrow DL beam, the network and the wireless device can fall back to the usage of wide beams. Note that the narrow beams used for transmission of additional RS may be temporarily transmitted, i.e. beam swept and/or repeated during a limited time period, and during this limited time period they may be transmitted with shorter intervals between the transmissions (even back to back) than the intervals being used for the static signals. Thus, since the fallback of using the second beam, e.g. wide beam, allows the communication to continue during the handover the performance of the wireless communication network is improved.

BRIEF DESCRIPTION OF THE DRAWINGS

Embodiments will now be described in more detail in relation to the enclosed drawings, in which:

FIG. 7c is a combined flowchart and signalling scheme according to embodiments herein;

FIGS. 14-17 are flowcharts illustrating methods implemented in a communication system including a host computer, a base station and a user equipment.

DETAILED DESCRIPTION

Figure 1:
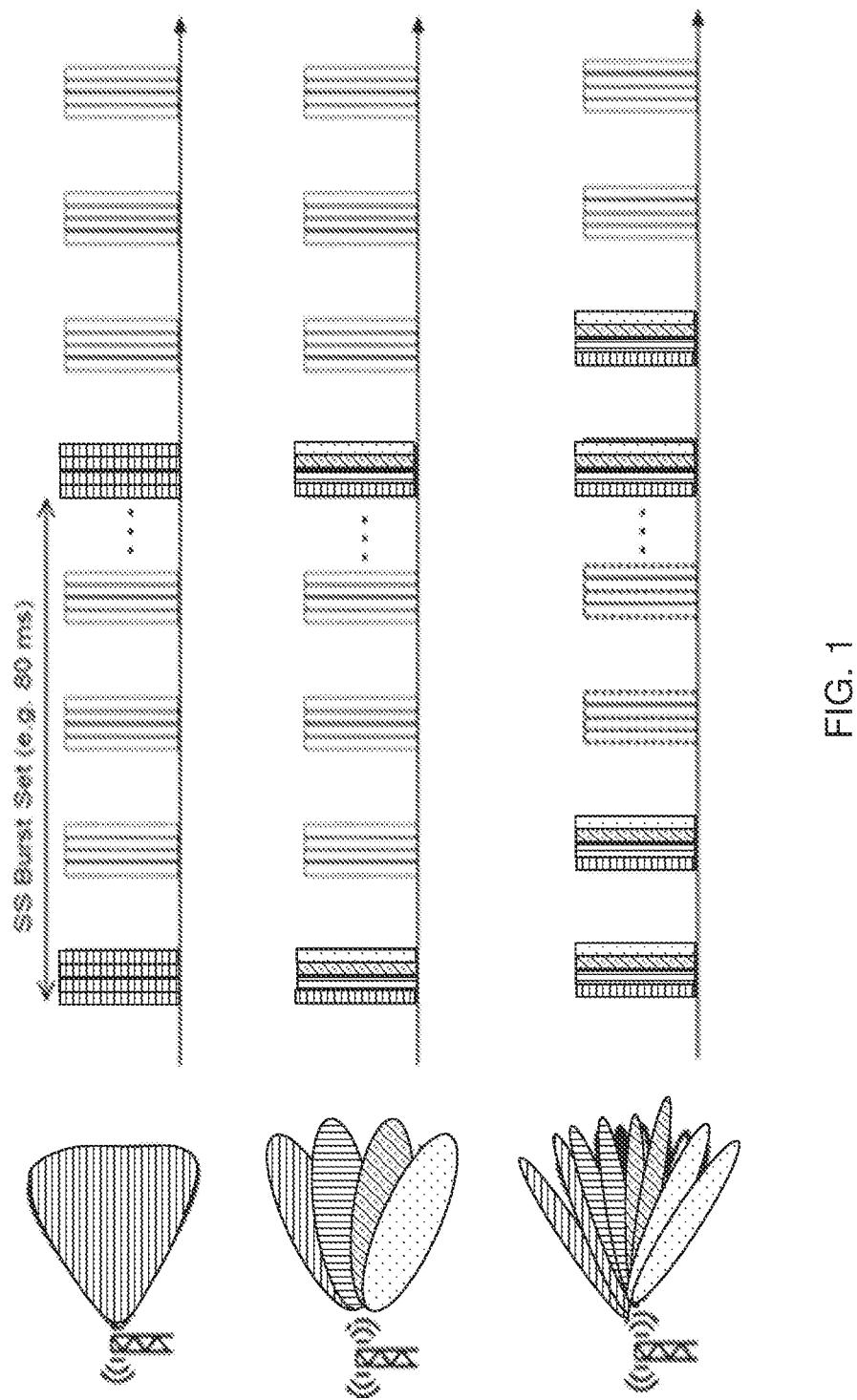
FIG. 1 is a schematic overview depicting examples of different configurations of an SS Burst Set.
Figure 2:
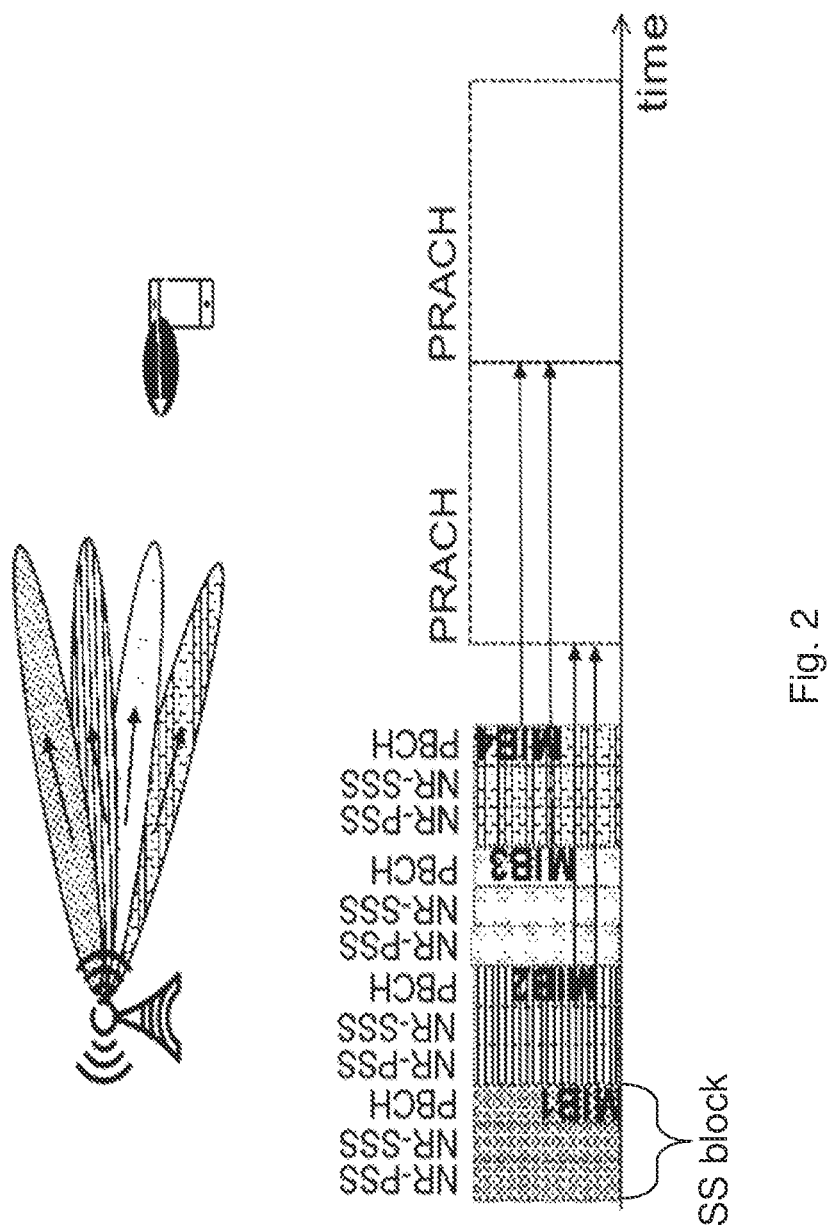
FIG. 2 is a schematic overview depicting mapping of a SS block to a PRACH.
Figure 3:
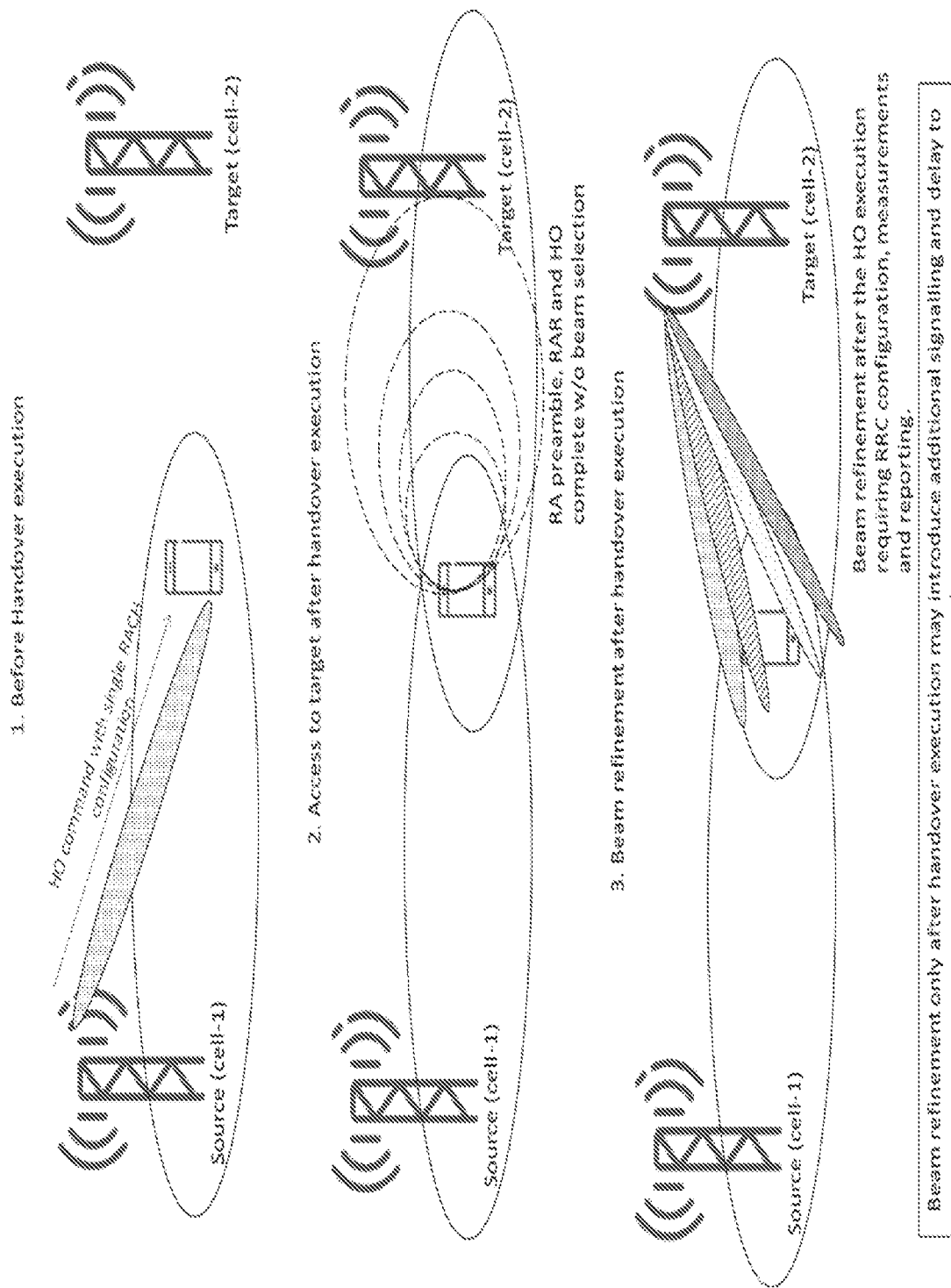
FIG. 3 is a schematic overview depicting a beam refinement procedure.
Figure 4:
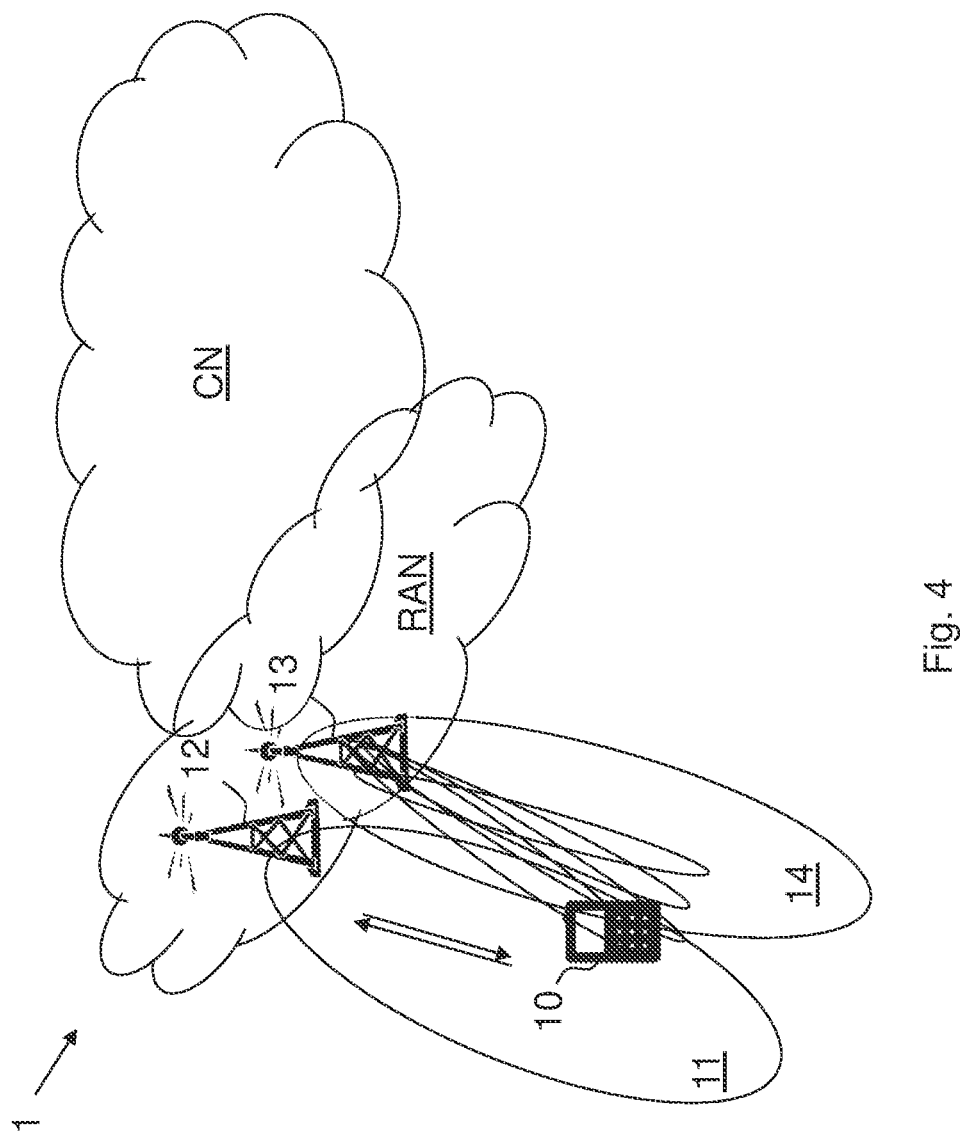
FIG. 4 is a schematic diagram depicting a wireless communications network according to embodiments herein.

Embodiments herein relate to wireless communication networks in general. FIG. 4 is a schematic overview depicting a wireless communication network 1. The wireless communication network 1 comprises one or more RANs and one or more CNs. The wireless communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, a wireless device e.g. a wireless device 10 such as a mobile station, a non-access point (non-AP) STA, a STA, a user equipment and/or a wireless terminal, may communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11, of a first radio access technology (RAT), such as NR, LTE, Wi-Fi, WiMAX or similar. The first radio network node 12 may be a transmission and reception point, a Wireless Local Area Network (WLAN) access point or an Access Point Station (AP STA), an access node, an access controller, a base station, e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit or node capable of communicating with a wireless device within the area served by the first network node 12 depending e.g. on the first radio access technology and terminology used. The first radio network node 12 may alternatively or additionally be a controller node or a packet processing node such as a radio controller node or similar. The first network node may be referred to as a serving network node wherein the first cell may be referred to as a serving cell, and the serving network node communicates with the wireless device 10 in form of DL transmissions to the wireless device 10 and UL transmissions from the wireless device 10.

The wireless communication network 1 further comprises a second radio network node 13, also referred to as the radio network node, providing radio coverage over a geographical area, a second service area 14, of a second radio access technology (RAT), such as NR, LTE, Wi-Fi, WiMAX or similar. The second radio network node 13 may be a transmission and reception point, a Wireless Local Area Network (WLAN) access point or an Access Point Station (AP STA), an access node, an access controller, a base station, e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the first radio access technology and terminology used. The second radio network node 13 may alternatively or additionally be a controller node or a packet processing node such as a radio controller node or similar. The second radio network node 13 may be referred to as a neighbouring network node wherein the second service area may be referred to as a neighbouring cell, and the second radio network node 13 communicates with the wireless device 10 in form of DL transmissions to the wireless device 10 and UL transmissions from the wireless device 10.

It should be noted that a service area may be denoted as cell, beam, beam group or similar to define an area of radio coverage. The first and second RAT may be the same RAT. Furthermore each cell is exemplified as being provided by separate radio network nodes but may in fact be provided by a same radio network node such as the first or the second radio network node. Thus, the first or second radio network node may provide multiple cells or radio coverage areas.

The radio network nodes transmit RSs, such as CSI-RSs over respective service area. Hence, the first and second radio network nodes transmit MRS, CSI-RSs or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first MRS, for identifying the first service area 11 in the wireless communication network. The second radio network node 13 provides radio coverage over the second service area 14 using a second reference signal, e.g. second MRS, for identifying the second service area 14 in the wireless communication network. These reference signals, first and second MRS, may be initiated upon request from a radio network node, e.g. a neighboring radio network node, or configured to be sent continuously.

The problem described herein, i.e. reduced performance upon changing cell, may be solved by a method where inter-cell mobility, i.e. movement between different cells, and narrow DL beam selection are jointly performed. That is done with the help of an additional RS transmitted in narrow DL beams, compared to the beams transmitting in the SS Block Burst Sets, where the additional RS may be a configured CSI-RS associated with the target cell associated with the handover execution.

The network may provide to the wireless device 10, such as an RRC_CONNECTED wireless device, a mapping between RACH configurations and reference signals (RS) that can be transmitted with high gain beamforming, which are different than reference signals of static signals transmitted in wide beams. Static signals may be the ones in NR transmitted in the SS Block, such as NR-PSS/NR-SSS/TSS and demodulation reference signal (DMRS) for PBCH, while the additional RS may be a CSI-RS. At the network side, the additional RS may be transmitted in narrow beams while beamforming the SS Block transmissions in wide beams. The RS-RACH configuration mapping may be provided when the network decides to handover the wireless device from a serving cell to a target cell and/or when the network wants to establish a dual connectivity, a multi-connectivity, a carrier aggregation or equivalent. This may be the case when the wireless device is connected to LTE and an NR cell is a target cell candidate or a potential secondary cell for inter-RAT handover, NR-LTE dual connectivity/tight interworking. Hence, the mapping can be provided to the UE in an RRCConnectionReconfiguration message associated with a target cell (or candidate to be the SCell) in the same RAT, denoted as intra-RAT, or in a different RAT, denoted as inter-RAT.

A next step is the DL beam selection at the wireless device during the handover execution. Therein, the provided mapping may be used during the access of a target and/or secondary cell i.e. during a handover execution or the establishment/addition of a secondary cell. After receiving the RRC message from the serving cell that triggers the access to the target or secondary cell, e.g. RRCConnectionReconfiguration, the wireless device then searches for the additional RSs associated with the target cell, performs measurements and selects the RS associated with the best quality, for example, based on best Reference Signal Received Power (RSRP), Signal to Noise plus Interference Ratio (SNIR), signal to noise ratio (SNR) or some other measure of the signal strength or signal quality. In other words, the wireless device selects the strongest or best-quality DL narrow beam transmitting the additional RS.

After the selection of the strongest DL beam e.g. based on measurements of the additional RS, the wireless device 10 initiates a random access procedure associated with the configured RACH for the selected RS e.g. uses a RACH preamble or RACH resource mapped to the selected beam.

And, then, DL beam selection at the radio network node for RAR and/or control plane or user plane data starts. Upon the reception of the RACH preamble in the time and/or frequency resource that maps to a given DL beam, the network detects what is the strongest DL narrow beam covering the wireless device. The radio network node has the option to transmit the RAR via the detected narrow beam and, even before setting up the beam management procedure start using the selected DL beam with narrow gain beamforming for data transmission on PDSCH, immediately after the handover complete message and/or the setup of the secondary cell.

Figure 5A:
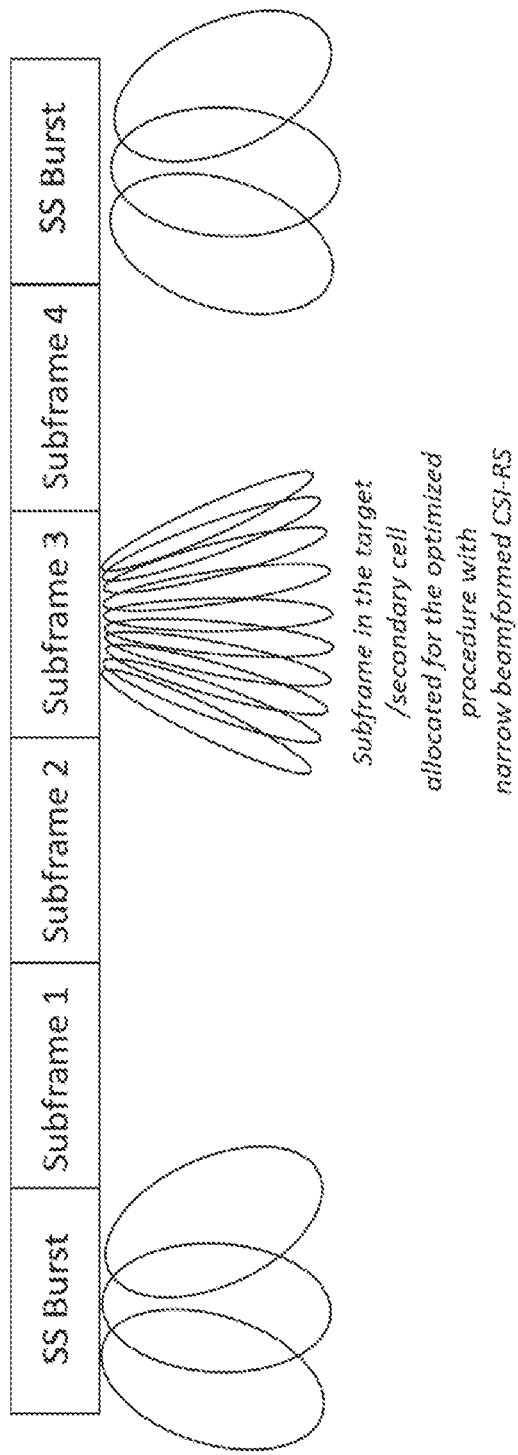
FIG. 5a shows configurations of subframes for beam transmissions.
Figure 5B:
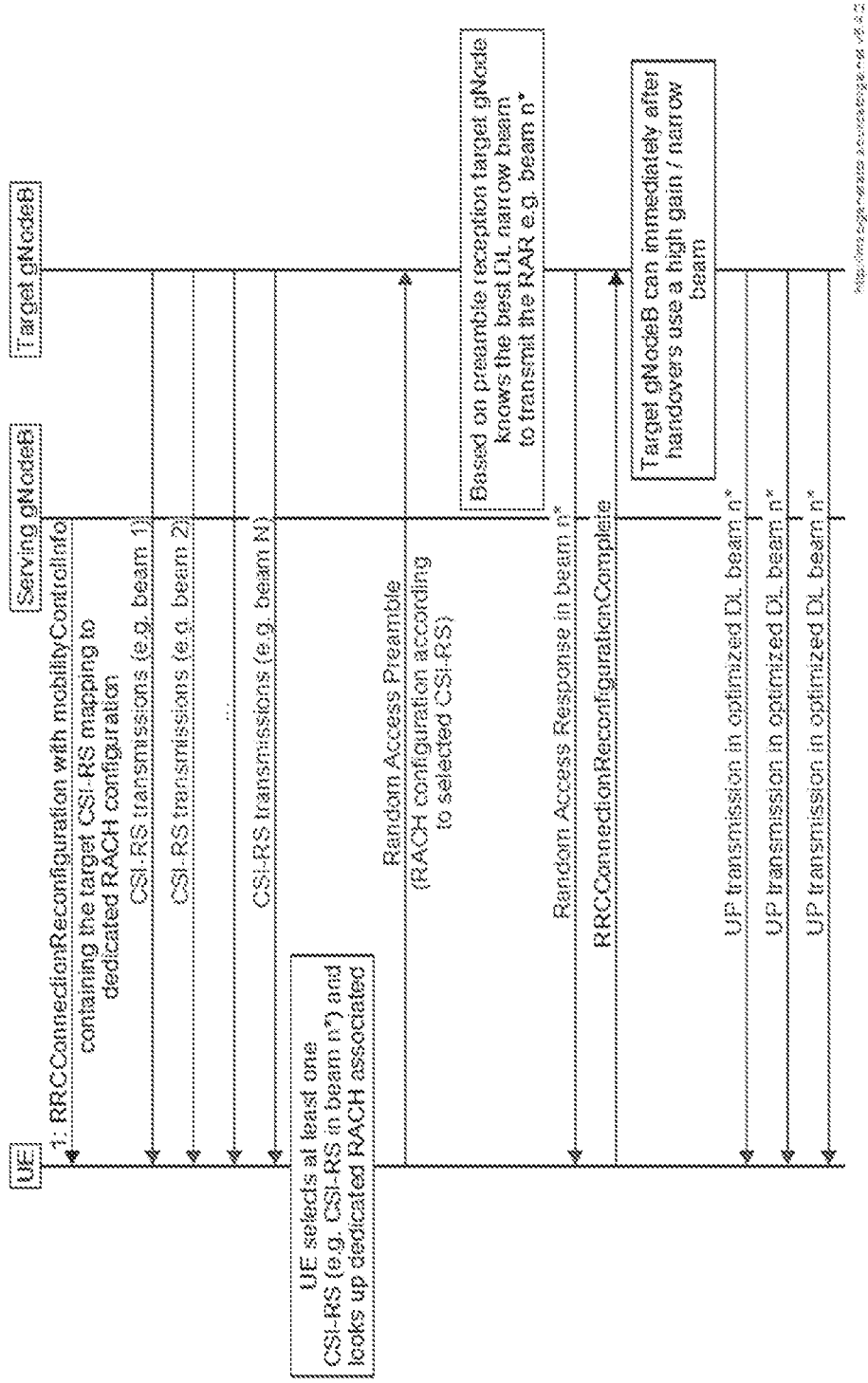
FIG. 5b shows a signaling flow diagram where the optimized handover execution is combined with beam selection process.

FIGS. 5a and 5b show an example of a configured subframe in the target cell the wireless device 10 may try to use to select the strongest beam via CSI-RS measurement between SS Block Bursts and a signaling flow diagram where the optimized handover execution combined with beam selection is described.

After sending the RACH preamble associated with the selected beam the prior art method assumes that the network maps the detected RACH preamble and maps to the correct DL narrow beam to transmit the RAR and subsequently the User Plane (UP) data.

However, different error cases associated with the RACH procedure based on an additional RS, e.g. CSI-RS in NR, may occur, especially in the case the wireless device 10 uses as a DL reference signal transmitted in a narrow beam where coverage can be spottier. To understand better the error cases, one needs to understand the RAR reception in LTE.

Hereinafter the terms time window, window, RAR time window, reception window, RAR reception window, and reception time window may be used interchangeably.

Figure 6A:
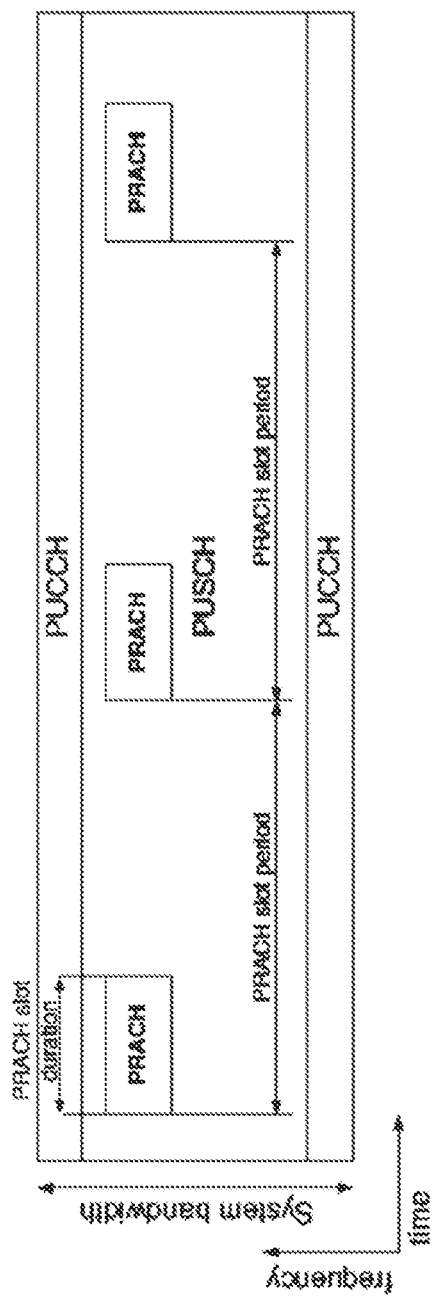
FIG. 6a shows PRACH multiplexing with PUSCH and PUCCH.
Figure 6B:
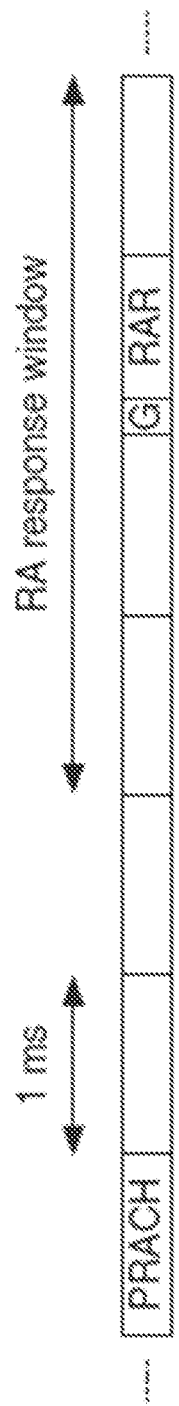
FIG. 6b shows Timing of the Random Access Response window.

At least in LTE, the Random Access Response (RAR) is sent by the second radio network node 13 on the Physical Downlink Shared CHannel (PDSCH), and addressed with an identity (ID) such as a Random Access Radio Network Temporary Identifier (RA-RNTI), identifying a time-frequency slot in which a preamble was detected. The wireless device 10 expects to receive the RAR within a time window, of which the start and end are configured by e.g. the first radio network node. The earliest subframe allowed by the specifications occurs 2 ms after the end of the preamble subframe, as illustrated in FIG. 6b. However, a typical delay, e.g. measured from the end of the preamble subframe to the beginning of the first subframe of RAR window, is more likely to be 4 ms. The FIGS. 6a and 6b show the RAR consisting of the step 2 message, on PDSCH, together with its downlink transmission resource allocation message 'G', on the Physical Downlink Control Channel (PDCCH). FIG. 6a shows PRACH multiplexing with PUSCH and PUCCH. FIG. 6b shows Timing of the Random Access Response window.

In LTE, at least during initial access, different problems may exist:

Error case 1: The wireless device 10 does not receive the RAR within the configured time window;

Error case 2: The wireless device 10 receives the PDCCH signaling indicating the downlink resource used for the RAR but cannot satisfactorily decode the RAR message.

If the wireless device 10 does not receive a RAR within the configured time window, the wireless device 10 may select a preamble again and transmits another preamble. The minimum delay for the transmission of another preamble after the end of the RAR window is 3 ms. If the wireless device receives the PDCCH signaling indicating the downlink resource used for the RAR but cannot satisfactorily decode the RAR message itself, the minimum delay is increased to 4 ms, to allow for the time taken by the wireless device in attempting to decode the RAR. The first radio network node 12 may configure preamble power ramping so that the transmission power for each transmitted preamble is increased by a fixed step.

A problem in general with handover in NR, which is associated with beam management is that after the handover, depending on the data rates or service, the desired wireless device performance requires that the target cell triggers a beam management operation of beam refinement, enabling the wireless device 10 to use a narrow beam for PDCCH and/or PDSCH in the target cell. That may require an additional configuration, e.g. using RRC and/or L1/L2 signaling, additional measurement and reporting mechanisms and additional delay to perform measurements in the target cell e.g. based on CSI-RS processes configured for beam management. In other words, after the handover, it may take some time until the wireless device 10 again can access a narrow beam in the target cell, so it can take some time until the target cell can start to beamform PDSCH with high gain enabling high data rates. As a result, if the wireless device 10 was using high data rate communication using narrow, high-gain beamforming in the previous cell, there will be a dip or gap in the data rate—and thus the service quality—in conjunction with the handover before equally high data rates and service quality can be achieved with a refined beam in the new cell.

A handover procedure may be more sensitive to sudden changes in the radio environment, i.e. the radio channel quality, since a narrow DL beam is used by the wireless device 10 as DL reference for the PRACH resources, such a time/frequency resource(s), and also which RACH preamble the wireless device 10 should transmit may be defined. The network is intended to detect that specific preamble and transmit the RAR in that narrow DL beam corresponding to the detected preamble.

However, one problem that may occur is that a wireless device does not detect the RAR within the time it has been configured to. In NR that may occur if the wireless device selects the wrong DL beam transmitting the additional RS such as a CSI-RS, or measurements at the wireless device about best beam are outdated so that the wireless device is no longer located in the coverage of the beam that was the best during the RS measurement procedure. The latter may have two consequences, i.e. two different error cases: 1) the wireless device's shift to a new location when transmitting the preamble may cause the radio network node to fail to receive it, because it uses an RX beam (supposedly using analog RX beamforming) which does not cover the direction in which the preamble transmission from the wireless device arrives; or 2) the radio network node successfully receives the preamble from the wireless device, e.g. because it uses a wide enough RX beam or because it uses digital RX beamforming, trying different beamforms using post-processing of the received signal, but then the wireless device fails to receive the RAR, because the DL beam the radio network node chooses for the RAR, i.e. the one mapping to the RACH configuration such as UL transmission resources and/or preamble, does not reach the wireless device with sufficiently high SINR/SNR.

These are thus additional problems that stem from the use of beamforming in NR, especially when narrow beams are used.

According to embodiments herein the wireless device 10 may be configured to access a target cell, for example during a handover execution procedure or during a transition from RRC_INACTIVE to RRC_CONNECTED state, with two mappings between DL beams and per cell RACH resources: i) a narrow beam RACH mapping to be initially used to access the target cell so that target can directly know the best DL narrow beam with which to send the RAR to the wireless device 10 and start subsequent data transmission and ii) a wide beam RACH mapping (fallback), to be used in the case the wireless device 10 and network detects that the first procedure has failed.

The wireless device 10 transmits a preamble, a first preamble, in accordance with a RACH configuration associated with a selected DL beam such as a (best) narrow CSI-RS DL beam also referred to as a first beam.

The wireless device 10 then monitors for a RAR in a first RAR reception window e.g. a regular (configured) RAR reception window, in which e.g. the second radio network node 13, in case of successful reception of the first preamble, will use narrow beamforming to transmit the RAR. If the RAR is received, none of the herein considered error cases has occurred and the wireless device 10 proceeds with the network access procedure.

However, if the wireless device 10 does not receive any RAR in the first RAR reception window, it instead transmits a second preamble associated with a second beam e.g. a wide beam wherein the first preamble is associated with channel state information reference signal, i.e. narrow beam, and the second preamble associated with a synchronization signal block, i.e. wide beam. Alternatively, the wireless device waits for a RAR in a second reception window, in which the second radio network node 13, in case of failure to receive a subsequent, i.e. a message transmitted by the wireless device 10 after receiving the RAR, transmits a RAR using a second e.g. wide(r) beam. Note that this second reception window may also be realized as an extension of the first RAR reception window, essentially forming a single RAR reception window but with extended length. If the wireless device 10 successfully receives a RAR in the second (or extended part of the) reception window, the wireless device 10 proceeds with the network access procedure.

However, if the wireless device 10 does not receive any RAR in the second (or extended part of the) RAR reception window, the wireless device 10 may transmit the second preamble, this time associated with e.g. a wide beam i.e. a different beam than the selected DL beam. When doing this, the wireless device 10 may use the RACH configuration associated with a wide beam which either has been detected (and selected) previously, e.g. a wide beam SS Block transmission which the wireless device 10 detected when it acquired synchronization in the cell, or which the wireless device 10 identifies during a new wide beam selection procedure. These two alternatives may also complement each other, such that a second RACH preamble may be transmitted based on the RACH configuration associated with a previously detected, and selected, wide beam, but if no RAR is received in response, then the wireless device 10 performs a new wide beam selection and transmits a third preamble in accordance with the RACH configuration of the newly selected wide beam.

Optionally, provided that the narrow beam transmissions of the additional RS, e.g. CSI-RS, are still available, the wireless device 10 may perform a new narrow beam selection instead of a wide beam selection and transmit the second (or third) preamble in accordance with the RACH configuration associated with the newly selected narrow beam.

Embodiments herein enable the wireless device 10 and the second radio network node 13 to identify potential error cases when narrow beam selection is performed combined with a handover and/or a transition from inactive to connected state based on a narrow DL beam and/or addition of a connectivity leg to establish dual connectivity or multi-connectivity or to add a component carrier for carrier aggregation, and perform fallback to the second beam such as a wide beam when some kind of failure in the RAR reception is detected. The advantage is mainly that one may use e.g. the wide beams for static signals, use narrow beams for dynamic beamforming and, in the case of failures caused by the first e.g. narrow DL beam, the second radio network node 13 and the wireless device 10 can fall back to the usage of the wide beams. Note that the narrow beams used for transmission of additional RS may be temporarily transmitted consecutively, i.e. beam swept and/or repeated during a limited time period, and during this limited time period the beams may be transmitted with shorter intervals between the transmissions (even back to back) than the intervals being used for the static signals.

Note that in a general scenario the term "radio network node" can be substituted with "transmission point". The key observation is that it must be possible to make a distinction between the transmission points (TPs), typically based on MRSs or different synchronization signals and BRSs transmitted. Several TPs may be logically connected to the same radio network node but if they are geographically separated, or are pointing in different propagation directions, the TPs will be subject to the same mobility issues as different radio network nodes. In subsequent sections, the terms "radio network node" and "TP" can be thought of as interchangeable.

Figure 7A:
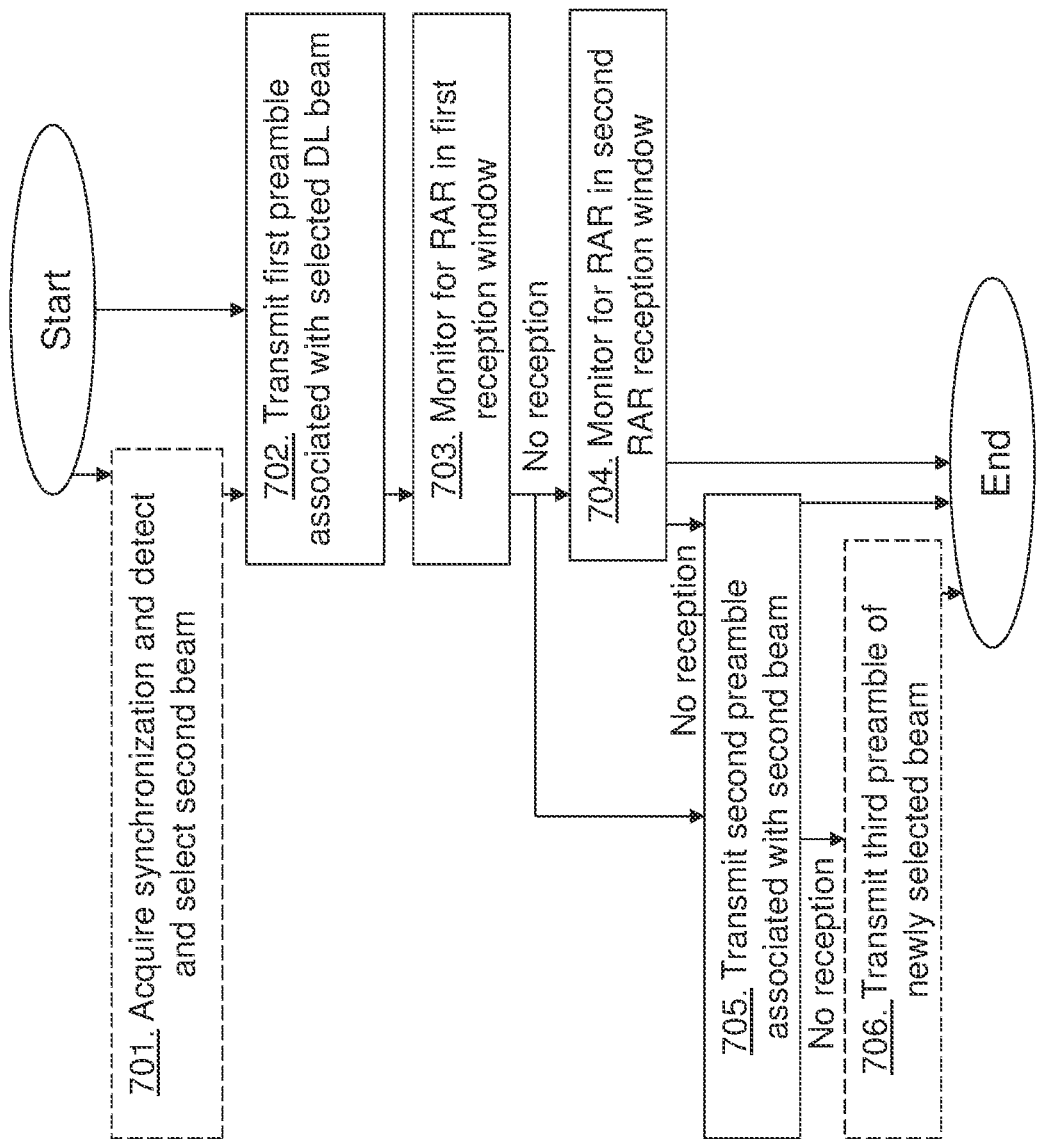
FIG. 7a is a flowchart depicting a method performed by a wireless device according to embodiments herein.

The method actions performed by the wireless device 10 for handling communication in the wireless communication network 1 according to embodiments herein will now be described with reference to a flowchart depicted in FIG. 7*a*. The actions do not have to be taken in the order stated below, but may be taken in any suitable order. Actions performed in some embodiments are marked with dashed boxes.

Action 701. The wireless device 10 may acquire synchronization with a cell of the selected DL beam and may detect and select a second beam, e.g. a wider beam, using the acquired synchronization.

Action 702. The wireless device transmits to a radio network node, such as the second radio network node 13 during e.g. a handover or the first radio network node 12, a first preamble associated with a selected DL beam. The DL beam may be selected based on signal strength or signal quality. This may be triggered by receiving a message indicating a cell selection or a handover.

Action 703. The wireless device 10 monitors for a RAR in a first RAR reception window.

Action 704. When the RAR is not received in the first RAR reception window, the wireless device 10 monitors for the RAR in a second RAR reception window of a different beam. The second RAR reception window may be an extension of the first RAR reception window. The different beam may be a wider beam than the selected downlink beam; wider herein meaning covering a larger area than the selected DL beam.

Action 705. Alternatively, when the RAR is not received in the first RAR reception window, the wireless device 10 transmits, to the second radio network node, the second preamble associated with the second beam wherein the first preamble is associated with a channel state information reference signal and the second preamble is associated with a synchronization signal block.

Furthermore, when not receiving the RAR in the second RAR reception window, the wireless device 10 may transmit the second preamble associated with the second beam.

Action 706. When a RAR associated with the second preamble is not received, the wireless device 10 may transmit a third preamble of a newly selected beam.

Figure 7B:
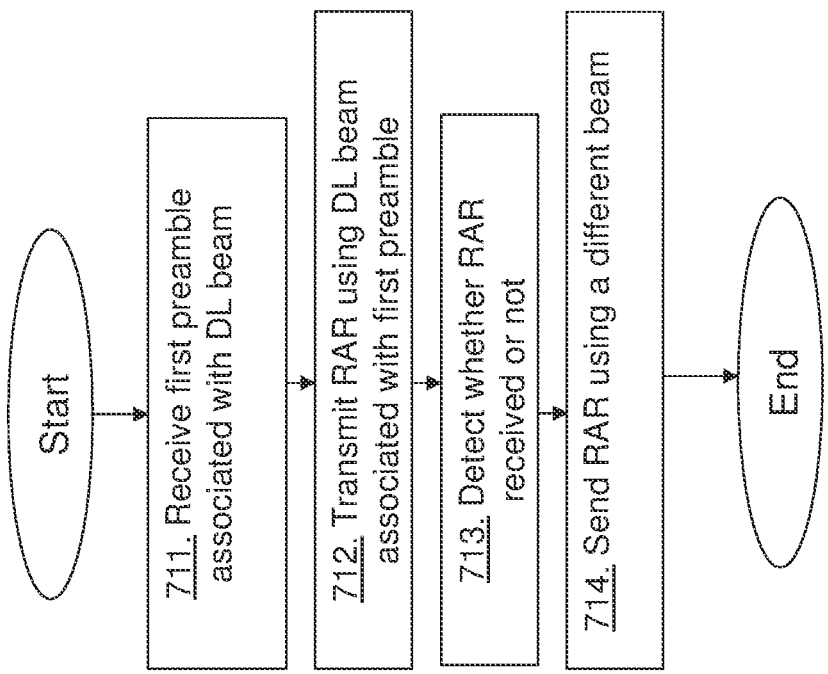
FIG. 7b is a flowchart depicting a method performed by a network node such as a location server according to embodiments herein.

The method actions performed by the radio network node e.g. the second radio network node 13 but may also be the first radio network node 12 for handling communication of the wireless device in the wireless communication network 1 according to embodiments herein will now be described with reference to a flowchart depicted in FIG. 7*b*. The actions do not have to be taken in the order stated below, but may be taken in any suitable order. Actions performed in some embodiments are marked with dashed boxes.

Action 711. The second radio network node 13 receives the first preamble associated with the DL beam.

Action 712. The second radio network node 13 transmits the RAR, using the DL beam associated with the first preamble.

Action 713. The second radio network node 13 detects whether the wireless device has successfully received the RAR or not. E.g. the second radio network node 12 may fail to receive a subsequent message related to the RAR from the wireless device 10.

Action 714. The second radio network node 13 sends the RAR a second time using a different beam when detected that the wireless device 10 has not successfully received the RAR. The different beam covers the DL beam the wireless device 10 has initially selected. E.g. a center direction of the different beam is equal to a center direction of the selected DL beam in action 702.

FIG. 7c is a combined flowchart and signaling scheme according to embodiments herein. The actions may be performed in any suitable order.

For example, the second radio network node 13 transmits its beams, i.e. the second radio network node 13 transmits reference signals (RS) associated with a respective beam, e.g. PSS, SSS, TSS, DMRS, CSI-RS, BRS, or similar.

Action 721. The wireless device 10 may perform repeatedly measurements on the reference signals, i.e. on a number of beams, transmitted from the second radio network node 13, over a set time interval.

Action 722. The first radio network node 12 may then receive a measurement report and determine to request a handover for the wireless device 10 (or a set of wireless devices) to a specific candidate target service area associated to the second radio network node 13. The first radio network node 12 may then transmit, to the wireless device 10, a handover command or a message indicating a handover of the wireless device 10 to the second radio network node 13.

Action 723. The wireless device 10 selects beam and transmits a preamble, i.e. the first preamble, in accordance with the RACH configuration associated with the selected (best) narrow CSI-RS DL beam.

Action 724. The wireless device 10 then waits for a RAR in the regular (configured) RAR reception window, in which the network, in case of successful reception of the preamble, will use narrow beamforming to transmit the RAR. If the RAR is received, none of the herein considered error cases will occur and the wireless device 10 proceeds with the network access procedure.

Action 725. However, if the wireless device 10 does not receive any RAR in the first RAR reception window, it instead waits for a RAR in the second reception window, in which the network, in case of failure to receive a subsequent message, i.e. a message transmitted by the wireless device 10 after receiving the RAR, transmits a RAR using a wide(r) beam. Note that this second RAR reception window may also be realized as an extension of the first RAR reception window, essentially forming a single RAR reception window. If the wireless device 10 successfully receives a RAR in the second (or extended part of the) reception window, the wireless device 10 proceeds with the network access procedure. Alternatively, (not shown) when the RAR is not received in the first RAR reception window, the wireless device 10 may transmit the second preamble associated with the second beam wherein the first preamble is associated with a channel state information reference signal and the second preamble is associated with a synchronization signal block.

Action 726. However, if the wireless device 10 does not receive any RAR in the second (or extended part of the) RAR reception window, the wireless device 10 transmits the second preamble such as a second RACH preamble, this time associated with a wide beam. When doing this, the wireless device 10 uses the RACH configuration associated with a wide beam which either has been detected (and selected) previously, e.g. a wide beam SS Block transmission which the wireless device 10 detected when it acquired synchronization in the cell, or which the wireless device 10 identifies during a new wide beam selection procedure. These two alternatives may also complement each other, such that a second RACH preamble is transmitted based on the RACH configuration associated with a previously detected, and selected, wide beam, but if no RAR is received in response, then the wireless device 10 performs a new wide beam selection and transmits a third preamble in accordance with the RACH configuration of the newly selected wide beam.

Action 727. The second radio network node may transmit a RAR that is received at the wireless device.

Action 728. The second radio network node 13 and the wireless device 10 may then communicate over a User Plane (UP) transmission.

Examples of actions performed by the wireless device 10 for handling communication, such as enabling handover, of the wireless device 10 in the communication network 1 according to some embodiments will now be described with reference to a flowchart depicted in FIG. 8. The actions do not have to be taken in the order stated below, but may be taken in any suitable order. Actions performed in some embodiments are marked with dashed boxes. Additional RSs are exemplified herein as CSI-RSs.

The wireless device 10 is configured to access a target cell (for example during a handover execution procedure or during a transition from inactive to connected state) with two mappings between DL beams and RACH resources:

A first mapping of RSs and RACH resources also referred to as a narrow beam RACH configuration mapping (including multiple narrow beams, e.g. identified by CSI-RS, and multiple corresponding RACH configurations); and A second mapping of RSs and RACH resources also referred to as a wide beam RACH configuration mapping (fallback) (including one or more wide beam(s), e.g. identified by TSS, and one or more corresponding RACH configurations).

The wireless device 10 may receive (action 801) the two mappings, which may also be referred to as RACH mapping configurations. Upon receiving those two mappings, the wireless device 10 may perform a selection of a best, based on e.g. signal strength or quality, DL narrow beam e.g. using the configured CSI-RS(s) in the target cell. The CSI-RS may be mapped to one of the received RACH mapping configurations, e.g. time/frequency resources, in order to transmit an allocated dedicated preamble.

The wireless device 10 may then transmit (action 802) a RACH preamble from a mapping such as the first mapping.

Upon transmitting the dedicated preamble, the wireless device 10 starts to monitor (action 803) the first RAR reception window such as a first Random Access Response (RAR) time window, which may also be configured by the source cell, wherein the first radio network node 12, e.g. gNB, serving the source cell in turn may have received the RAR window configuration from the second radio network node 13, e.g. gNB, serving the target cell, e.g. during a handover preparation procedure.

If the wireless device 10 receives a RAR within that configured first RAR reception window, the wireless device 10 continues the random access procedure and, using the UL grant received in the RAR the wireless device 10 transmits (action 804) the HO complete message (or the message 3 associated with the establishment of dual connectivity, carrier aggregation or even a transition from inactive to connected state). The successful reception of the RAR from the target radio network node indicates to the wireless device 10 that the target cell has successfully detected the preamble and consequently the association with the best narrow DL beam covering the wireless device 10.

According to embodiments herein, if the wireless device 10 does not receive a RAR within that configured RAR time window, the wireless device 10 will trigger (action 805) the second RAR time window (notice that embodiments herein also apply using a single longer RAR time window), which is part of e.g. the wide beam mapping configuration. Optionally the wireless device 10 adapts its receive beam (if used) to a wider configuration matching the wider beam the network will use for the second RAR transmission attempt. If the wireless device 10 receives the RAR within that second RAR time window the wireless device 10 may continue the random access procedure and may transmit (action 806) the HO complete message (or the message 3 associated with the establishment of dual connectivity, carrier aggregation or a transition from inactive to connected state). The successful reception of the RAR from the target in the second window (or in the second part of the long single RAR time window) indicates to the wireless device 10 that the radio network node has successfully detected e.g. the preamble associated with a narrow DL beam that was the best at the moment when the wireless device 10 selected the beam but it has changed when the network transmitted the first RAR attempt (to the point it could not be detected, i.e. the wireless device 10 had moved out of the coverage of the selected narrow DL beam). In other words, receiving the RAR in the second part of the window (or in the second RAR window) indicates that change.

If the wireless device 10 does not receive a RAR within the second RAR time window, which may be part of the wide beam mapping configuration, the wireless device 10 may perform a wide beam selection (action 807) i.e. select the best wide beam of the target cell. That selection may be done, for example, by performing measurements on a SS Burst Set and using e.g. the TSS to make a distinction among wide beams in the SS Block Burst. Note that the wireless device 10 might have been performing these measurements even trying to access the target cell, in some kind of wide beam tracking so that processes could be speeded up.

The outcome of the wide DL beam selection may be a TSS (or any other wide beam indication) that can be mapped to one of the received wide beam RACH configurations at the wireless device 10, received from the source cell. After the wide DL beam selection, the wireless device 10 may transmit the configured preamble in the RACH resource associated with the mapped configuration. After transmitting the preamble, the wireless device 10 may wait (action 808) for a third (fallback) RAR time window. If the wireless device 10 receives the RAR within the third RAR time window the wireless device 10 may continue the random access procedure and transmits (action 809) the HO complete message (or the message 3 associated with the establishment of dual connectivity, carrier aggregation or even a transition from inactive to connected state). The successful reception of the RAR in the third time window indicates to the wireless device that the radio network node successfully detected the second preamble transmission (that could be the same preamble or not, depending on how the RACH configuration allocated preamble for the CSI-RS based procedures compared to the fallback procedure), associated with e.g. a wide DL beam that is not the same that covered the initially best selected narrow CSI-RS beam. If the wireless device 10 cannot detect a RAR within that third time window, the wireless device 10 may perform power ramping procedures (action 810) as indicated in the system information and/or received as part of the system information and/or via the dedicated message as part of the fallback configuration.

Figure 8:
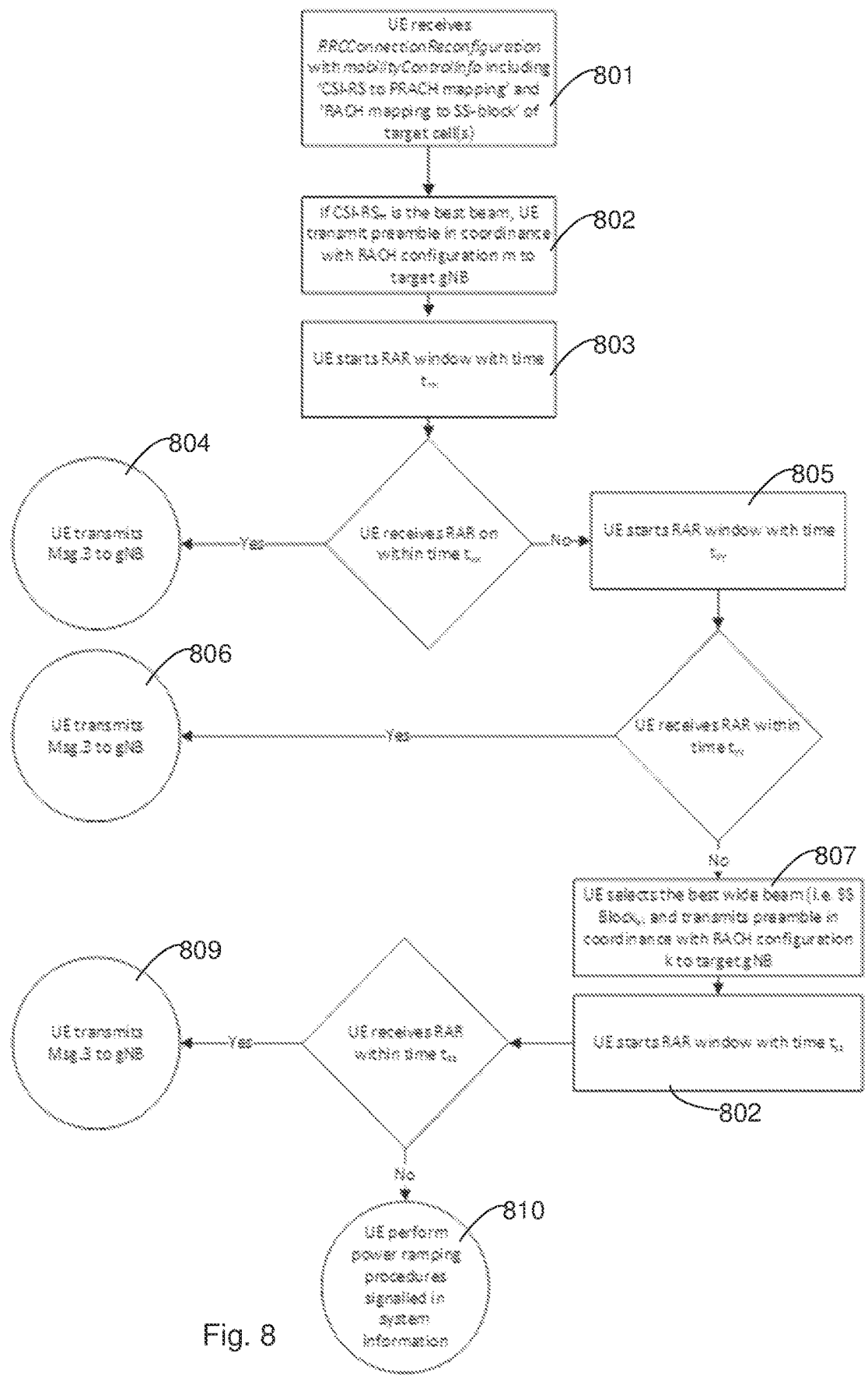
FIG. 8 is a combined flowchart and signalling scheme according to embodiments herein.

An example realization of this fallback procedure is illustrated through a flowchart in FIG. 8.

A further aspect that may contribute to facilitating or speeding up the above described fallback procedure, in particular the action involving the selection of the new beam exemplified as a wide beam selection and transmission of the second preamble, see action 705, is that before measuring on the CSI-RS, the wireless device 10 may acquire synchronization, see action 701, in the concerned cell, unless the concerned cell is tightly synchronized with another cell in which the wireless device 10 already has acquired synchronization, where "tightly synchronized" means that the wireless device 10 should be able to receive a DL transmission in one of the cells more or less within a cyclic prefix when applying the synchronization of the other cell, e.g. a serving/source cell. The statement that the wireless device 10 may be synchronized with the target cell within the cyclic prefix to receive the additional RS (e.g. CSI-RS) is based on the assumption that the additional RS will not contain a synchronization component with properties that allow the wireless device 10 to detect the RS by searching through a large number of timing (and frequency) hypothesis with a reasonable processing effort. The existence of such synchronization component in the additional RS is however not unconceivable, but more likely is that the additional RS will consist of a signal with properties that make it good for channel quality measurement purposes and allows the wireless device 10 to maintain fine synchronization. This is provided that the initial, coarser synchronization within the cyclic prefix has already been achieved. When acquiring this synchronization in the concerned cell the wireless device 10 receives the PSS, SSS and possibly TSS (which are part of the SS Block transmissions) of the concerned cell. Having done this detection of the SS Block transmission in the concerned cell, the wireless device 10 may know in which resources to look for such transmissions during the fallback procedure. It is even possible that the wireless device 10 can consider previously performed detections (and measurements) on SS Block transmissions as a proactively performed wide beam selection for the fallback procedure and assume that the RACH configuration associated with the "proactively" selected best wide beam as valid. The wireless device 10 may then use this proactive wide beam selection and corresponding RACH configuration to transmit the second preamble. This could optionally be an intermediate action and if that also fails, the wireless device 10 performs the above described wide beam selection and transmits a third preamble accordingly associated with the newly selected beam in action 706. In order not to unnecessarily delay the overall access procedure by using this intermediate step, the wireless device 10 may initiate and perform the new wide beam selection in parallel, e.g. while waiting for a RAR in response to the preamble transmitted based on the RACH configuration associated with the previously selected wide beam.

An alternative to basing the fallback procedure on wide beam selection may be that the wireless device 10 restarts its narrow beam selection based on the narrow beam RS transmissions (e.g. CSI-RS transmissions). To enable this alternative, the additional RS may be configured to be transmitted over this extended period of time so that the wireless device 10 has time to perform the narrow beam selection a second time. This CSI-RS configuration may be conditional, such that it is extended in time only if the first RACH procedure (including the narrow beam RAR and wide beam RAR) fails.

The wireless device 10 may receive a second RAR after receiving a first RAR, for example, if the network erroneously determines that the wireless device 10 has not detected the first RAR (because the subsequent message, e.g. Msg3 or handover complete message, was lost) and sends a second one. In that case the wireless device 10 may discard the first RAR and proceed with the access procedure in accordance with the second RAR.

Embodiments herein also comprise a radio Self-Organizing Network (SON) function where the wireless device 10 may store the failure related information to be possibly transmitted together with message 3 (or as failure reports, e.g. on request from the radio network node). That could comprise the radio conditions of the K best narrow DL beams that generated the failure and/or the occurrence of a fallback procedure. That can enable the network to later optimize the procedure and eventually not transmit that anymore. That information can be provided to the source cell.

Note that nothing has been described in terms of wireless device receiver beamforming in these two different periods. The assumption is that the wireless device 10 uses a wide RX beamforming for RAR detection and/or the strongest RX beam previously selected during the beam selection procedure. Similarly, the wireless device 10 may also use the strongest TX beam previously selection e.g. during some neighbor cell tracking procedure or use a wide (even omnidirectional) TX beam or a sweep of narrow beams, in case the RACH configuration is adapted to wireless device TX beam sweeping.

During handover preparation a target node, such as the second radio network node 13, may provide a source node, such as the first radio network node 12, with two RACH configurations so the wireless device 10 can access a target cell, wherein these RACH configurations are respectively associated e.g. mapped with e.g. narrow DL beam transmissions and wide DL beam transmissions, as described above. In the case the procedure is to be used for the transition from RRC_INACTIVE to RRC_CONNECTED state the nodes reserving these resources could exchange this information and define a validity time and/or area for these resources. A possible alternative may also be to use common default configurations and their mappings to beams, which are known by all concerned nodes, e.g. gNBs, in the network. Such default configurations and mappings may be standardized and/or chosen by an operator and configured in all concerned nodes, e.g. gNBs, in the wireless communication network.

Once this preparation phase between nodes is concluded, for example, the handover preparation over the inter-node interface, e.g. between different nodes such as Xn in the case of NR, which can be across different gNBs and/or even across different RATs. Note that in some cases such an inter-node interface may not be available and then this inter-node communication can instead be relayed via one or more core network nodes. The target node such as the second radio network node 13 may monitor the PRACH resources associated with the different CSI-RS i.e. the target cell expects an incoming wireless device at certain PRACH resources where detection of the expected wireless device could be done via the allocated preamble for contention-free random access.

If the configured preamble (or one of the configured preambles, in the case the wireless device 10 has received dedicated preambles per CSI-RS) associated with narrow DL beam transmissions is detected at the monitored PRACH resources, the second radio network node 13 may prepare a RAR and transmits it with the narrow DL beam associated with the PRACH detection. After the transmission, the network, such as the second radio network node 13, monitors whether the wireless device 10 has successfully received the RAR by the reception of the handover complete message (or other message, e.g. in case of RRC_INACTIVE to RRC_CONNECTED state transition or addition of a connectivity leg to establish dual connectivity or multi-connectivity and adding a component carrier for carrier aggregation).

If the second radio network node 13 detects that the wireless device 10 has successfully transmitted the handover complete message (or other message implying that the wireless device 10 successfully received the RAR), the procedure ends it since that is an indication that the wireless device 10 has received and decoded the RAR and that the access procedure is successfully completed.

If the network, e.g. the second radio network node 13, determines that the wireless device 10 may not have been able to decode the RAR, for example, by the fact that it has not received the handover complete message (or other message as described above) in the expected resources (scheduled by an UL grant in the transmitted RAR), the second radio network node 13 sends the RAR a second time but over a wide beam. The wide DL beam that is selected by the second radio network node 13 should be covering, i.e. overlapping, the narrow DL beam the wireless device 10 has initially selected. The knowledge about which wide DL wide beam to use is obtained by checking the detected preamble (and the PRACH resources it was received in) to assume the previously detected narrow DL beam the wireless device 10 was detecting and choosing a wide beam that covers the narrow beam, e.g. with the center direction of the second beam being equal to—or close to—the center direction of the selected DL (first) beam. It is also possible that a certain group of narrow beams may be associated with a certain wide beam, in which case this wide beam would be used irrespective of which of the narrow beams in the associated group of narrow beams the detected preamble was associated with, i.e. this may result in that the center direction of the narrow beam is located closer to a side edge of the wide beam than to the center direction of the wide beam. As previously described, in case multiple narrow beams (e.g. CSI-RS transmissions) are associated with the same PRACH resources, their associated RACH configurations may instead differ in which preamble the wireless device 10 is to use. Hence, via the used PRACH resources and/or the preamble (transmitted by the wireless device 10 and received by the second radio network node 13), the second radio network node 13, e.g. gNB, may determine which narrow beam the wireless device 10 had selected as the best (even if it may no longer be the best, which may be the reason the first RAR transmission failed) and based on that select an appropriate wide (second) beam.

If in the second attempt the second radio network node 13 detects that the wireless device 10 has successfully transmitted the handover complete message in response to the second RAR, the access procedure has successfully concluded and ends.

If in the second attempt to transmit the RAR the second radio network node 13 detects that the wireless device 10 has not been able to successfully decode the RAR, for example, by detecting that no handover complete message (or other message) was received in the UL resources allocated by the UL grant in the second RAR, the second radio network node 13 may monitor its PRACH resources associated with wide beam transmissions, such as based on the TSS according to the configuration provided to the wireless device 10.

As an option, the second radio network node 13, may take additional proactive actions to avoid that the wireless device 10 proceeds to transmit the second preamble. This option can be used if there is some time left of the RAR window when the UL transmission resources allocated by the UL grant in the RAR has occurred. If so, and if no handover complete message (or other message) was received in the UL resources allocated by the UL grant in the RAR, the second radio network node 13, may perform a DL wide beam sweeping of the RAR and/or transmit the RAR in an even wider beam until the second radio network node 13 detects the handover complete message.

Another aspect on the network side relates to RACH resource partitioning for narrow DL beam and wide DL beam access. Upon configuring the wireless device 10 via the source cell i.e. the first radio network node 12, the target cell may select preamble per CSI-RS that enables the target cell to distinguish the DL narrow beams (e.g. in the case the same time/frequency resources for PRACH are allocated per groups of CSI-RSs) and, if relevant, the specific wireless device 10 (in the case of contention-free random access). In one embodiment that distinction is enable by providing the same time/frequency resources for PRACH for a set of detectable CSI-RS and a distinct preamble per CSI-RS, e.g. unique within the set of CSI-RS or unique among all CSI-RS in the cell, per configured incoming wireless device 10 so the network is able to distinguish between different wireless devices and DL beams to transmit the RAR and later the subsequent transmissions, e.g. user plane transmissions and/or further control signaling, after the HO complete message, or other message, depending on the type of access procedure being performed, as previously described.

If that also fails, the wireless device 10 is allowed to try to perform another measurement to update the strongest beam as long as the additional RS (e.g. CSI-RS) are still being transmitted, e.g. it is still within the configured time e.g. N subframes, i.e. a time period within which the CSI-RS are transmitted and/or within which their associated RACH configurations are valid. If the wireless device 10 gets the RAR but with low power, it means it could try to perform some power ramping method such as change the TX beamforming, e.g. use a narrower TX beam with higher beam gain and/or increase the transmission power.

If the CSI-RSs, or other additional RS, are no longer available, or their associated RACH configurations are no longer valid, the wireless device 10 may either use the tracking information about a best SS Block beam and use the previously configured RACH information per TSS or SS block, more stable in terms of RACH procedure since the SS Block is transmitted in a wide beam. As previously mentioned, this may be based on previous detection(s) of SS Block transmission(s) and/or on new detection(s) of SS Block transmission(s) (to ensure fresh, up to date wide beam selection). In other words, that may be a last step the wireless device 10 tries to access the cell.

As a possible alternative embodiment, which in some cases may be faster than the procedure described above, the wireless device 10 and the radio network node could act as follows (described in relation to the above description).

The wide beam transmission of the second RAR is skipped and the wireless device 10, upon failure to receive the first RAR, goes directly to the fallback step of transmitting the second preamble. If speed highly valued, the wireless device 10 may use the RACH configuration associated with a previously selected wide beam (e.g. a SS Block transmission detected when the wireless device acquired synchronization in the cell). Otherwise, or in case no RAR is received in response to a preamble transmitted based on the RACH configuration associated with the previously selected wide beam, the wireless device 10 may initiate wide beam selection or, if the narrow beam transmissions of the additional RS (e.g. CSI-RS) are still available, narrow beam selection and transmit a preamble in accordance with the RACH configuration of the selected (wide or narrow) beam.

Embodiments herein may relate to the use of a wide DL beam configuration as a fallback in the case the second radio network node 13 fails to send or the wireless device 10 fails to receive the RAR via the narrow DL beam, configured via CSI-RS.

Figure 9:
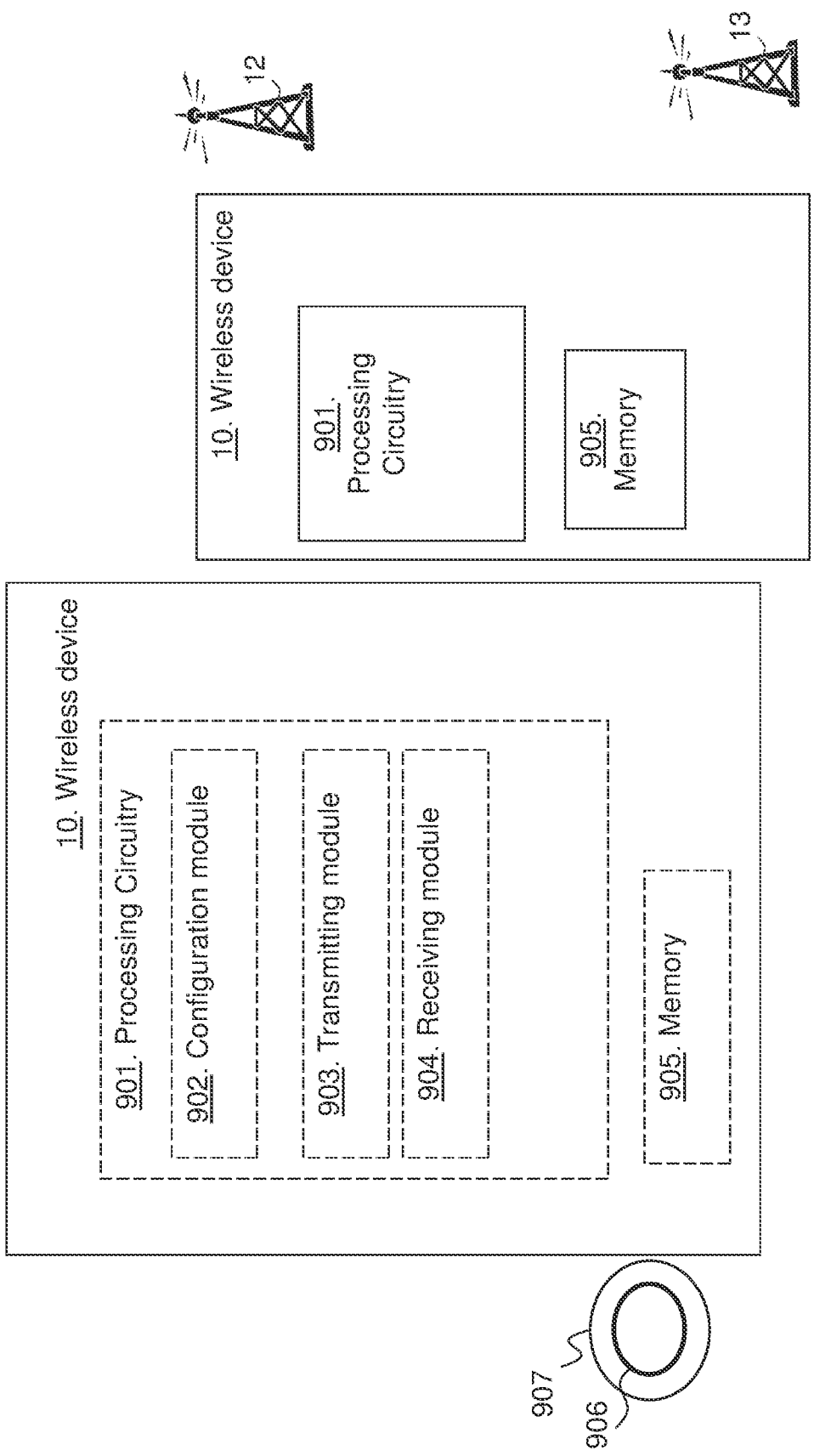
FIG. 9 shows an example of a method performed by a network node according to embodiments herein.

FIG. 9 is a block diagram depicting the wireless device 10, in two embodiments, for handling communication of the wireless device in the wireless communication network 1 according to embodiments herein.

The wireless device 10 may comprise processing circuitry 901, e.g. one or more processors, configured to perform the methods herein.

The wireless device may comprise a configuring module 902. The wireless device 10, the processing circuitry 901, and/or the configuring module 902 may be configured to access a target cell, the second service area 14, (for example during a handover execution procedure or during a transition from RRC_INACTIVE to RRC_CONNECTED state) with two mappings between DL beams and per cell RACH resources: i) a narrow beam RACH mapping to be initially used to access the target cell so that target can directly know the best DL narrow beam with which to send the RAR to the wireless device 10 and start subsequent data transmission and ii) a wide beam RACH mapping (fallback), to be used in the case the wireless device 10 and network detects that the first procedure has failed. The wireless device 10, the processing circuitry 901, and/or the configuring module 902 may be configured to acquire synchronization with a cell of the selected downlink beam; and to detect and select the second beam using the acquired synchronization.

The wireless device may comprise a transmitting module 903, e.g. a transmitter or a transceiver. The wireless device 10, the processing circuitry 901, and/or the transmitting module 903 is configured to transmit, to the radio network node 13, the first preamble associated with the selected downlink beam, e.g. transmit the first preamble in accordance with the RACH configuration associated with the selected (best) narrow CSI-RS DL beam.

The wireless device may comprise a receiving module 904, e.g. a receiver or transceiver. The wireless device 10, the processing circuitry 901, and/or the receiving module 904 is configured to monitor for a RAR in a first RAR reception window, e.g. wait for a RAR in the regular (configured) RAR reception window, in which the network, in case of successful reception of the preamble, will use narrow beamforming to transmit the RAR. If the RAR is received, none of the herein considered error cases has occurred and the wireless device 10 proceeds with the network access procedure. The wireless device 10, the processing circuitry 901, and/or the transmitting module 903 may be configured to, when the RAR is not received in the first RAR reception window, transmit, to the radio network node, the second preamble associated with the second beam wherein the first preamble is associated with a channel state information reference signal and the second preamble is associated with a synchronization signal block.

The wireless device 10, the processing circuitry 901, and/or the receiving module 904 may be configured to, when the RAR is not received in the first RAR reception window, monitor for the RAR in a second RAR reception window of a different beam. The second RAR reception window may be an extension of the first RAR reception window. The different beam may be a wider beam than the selected downlink beam.

E.g., if the wireless device 10, the processing circuitry 901, and/or the receiving module 904 does not receive any RAR in the regular RAR reception window, the wireless device 10, the processing circuitry 901, and/or the receiving module 904 is further configured to wait for a RAR in a second RAR reception window, in which the network such as the second radio network node 13, in case of failure to receive a subsequent, i.e. a message transmitted by the wireless device 10 after receiving the RAR, transmits a RAR using a wide(r) beam. Note that this second RAR reception window may also be realized as an extension of the regular RAR reception window, essentially forming a single RAR reception window. If the wireless device 10, the processing circuitry 901, and/or the receiving module 904 successfully receives a RAR in the second (or extended part of the) RAR reception window, the wireless device 10 proceeds with the network access procedure.

The wireless device 10, the processing circuitry 901, and/or the receiving module 904 may be configured to, when not receiving the RAR in in the second RAR reception window, transmit the second preamble associated with a second beam; and when a RAR associated with the second preamble is not received, the wireless device 10, the processing circuitry 901, and/or the transmitting module 903 may be configured to transmit the third preamble of a newly selected beam. E.g. if the wireless device 10, the processing circuitry 901, and/or the receiving module 904 does not receive any RAR in the second (or extended part of the) RAR reception window, the wireless device 10, the processing circuitry 901, and/or the transmitting module 903 is configured to transmit a second RACH preamble, this time associated with a wide beam. When doing this, the wireless device 10, the processing circuitry 901, and/or the transmitting module 903 is configured to use the RACH configuration associated with a wide beam which either has been detected (and selected) previously, e.g. a wide beam SS Block transmission which the wireless device 10 detected when it acquired synchronization in the cell, or which the wireless device 10 identifies during a new wide beam selection procedure. These two alternatives may also complement each other, such that a second RACH preamble is transmitted based on the RACH configuration associated with a previously detected, and selected, wide beam, but if no RAR is received in response, then the wireless device 10 performs a new wide beam selection and transmits a third preamble in accordance with the RACH configuration of the newly selected wide beam.

The wireless device 10 further comprises a memory 905. The memory comprises one or more units to be used to store data on, such as RSs, strengths or qualities, RAR reception windows, RACH information, preambles, commands, applications to perform the methods disclosed herein when being executed, and similar.

The methods according to the embodiments described herein for the wireless device 10 are respectively implemented by means of e.g. a computer program product 906 such as a computer program, comprising instructions, i.e., software code portions, which, when executed on at least one processor, cause the at least one processor to carry out the actions described herein, as performed by the wireless device 10. The computer program product 906 may be stored on a computer-readable storage medium 907, e.g. a universal serial bus (USB) stick, a disc or similar. The computer-readable storage medium 907, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium. Thus, the wireless device 10 may comprise the processing circuitry and the memory, said memory comprising instructions executable by said processing circuitry whereby said wireless device is operative to perform the methods herein.

Figure 10:
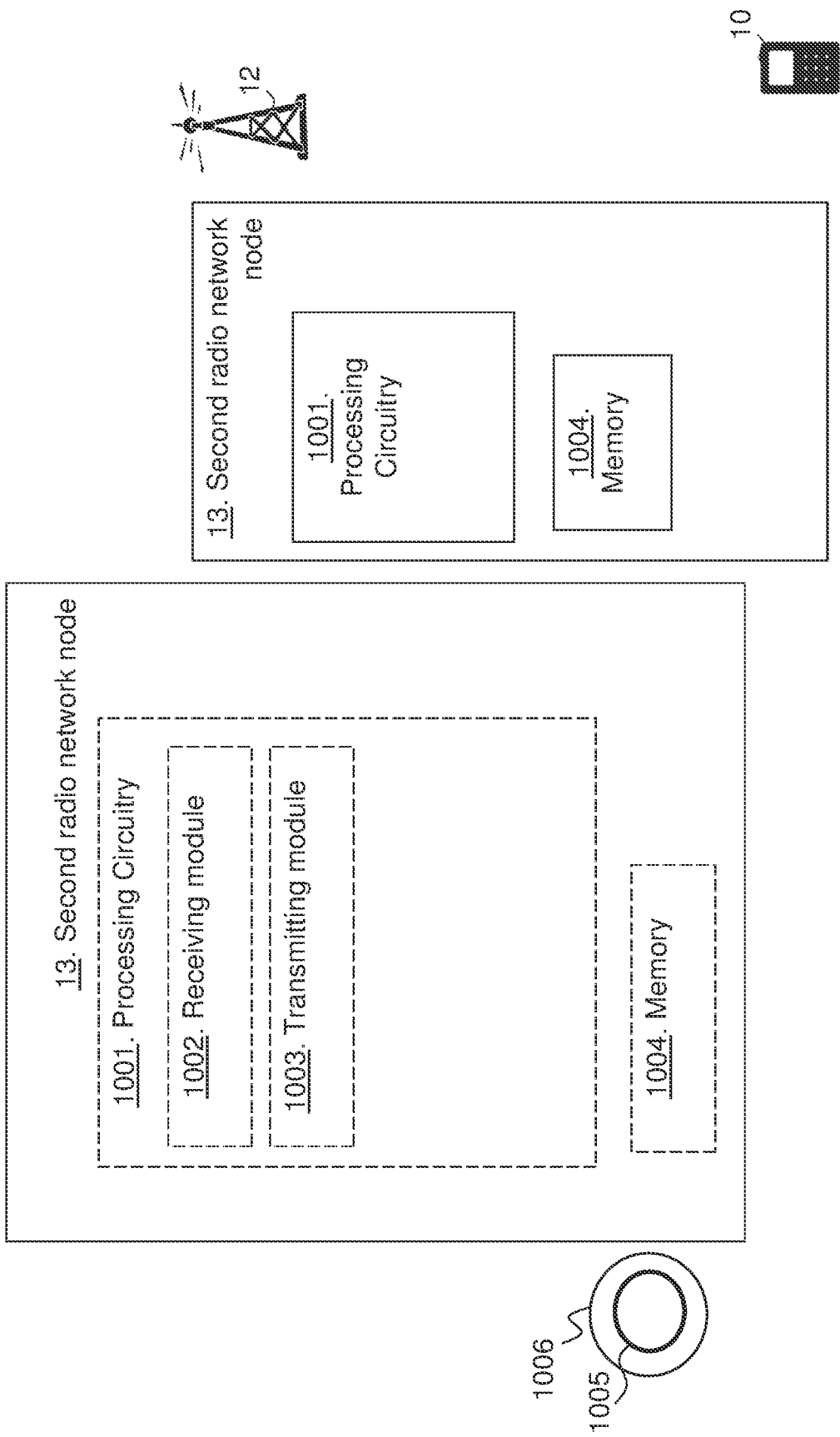
FIG. 10 is a schematic block diagram depicting a network node according to embodiments herein.

FIG. 10 is a block diagram depicting the second radio network node 13, in two embodiments, for handling communication of the wireless device in the wireless communication network 1 according to embodiments herein.

The second radio network node 13 may comprise processing circuitry 1001, e.g. one or more processors, configured to perform the methods herein.

The second radio network node 13 may comprise a receiving module 1002, e.g. a receiver or a transceiver. The second radio network node 13, the processing circuitry 1001, and/or the receiving module 1002 is configured to receive the first preamble associated with the DL beam such as a first RACH preamble, from the wireless device 10.

The second radio network node 13 may comprise a transmitting module 1003, e.g. a transmitter or a transceiver. The second radio network node 13, the processing circuitry 1001, and/or the transmitting module 1003 is configured to transmit the RAR using the DL beam associated with the first preamble. E.g. the second radio network node 13, the processing circuitry 1001, and/or the transmitting module 1003 may be configured to transmit a first RAR to the wireless device 10. The second radio network node 13, the processing circuitry 1001, and/or the receiving module 1002 is configured to detect whether the wireless device 10 has successfully received the RAR or not. The second radio network node 13, the processing circuitry 1001, and/or the receiving module 1002 may be configured to detect whether the wireless device 10 has successfully received the RAR by failing to receive a subsequent message related to the RAR from the wireless device 10.

The second radio network node 13, the processing circuitry 1001, and/or the transmitting module 1003 is configured to send the RAR a second time using a different beam when detected that the wireless device 10 has not successfully received the RAR, wherein the different beam covers the DL beam the wireless device has initially selected.

E.g. the second radio network node 13, the processing circuitry 1001, and/or the transmitting module 1003 may be configured to determine that the wireless device 10 may not have been able to decode the RAR, for example, by the fact that it has not received the handover complete message (or other message as described above) in the expected resources (scheduled by an UL grant in the transmitted RAR), the second radio network node 13, the processing circuitry 1001, and/or the transmitting module 1003 sends the RAR a second time but over a wide beam. If in the second attempt to transmit the RAR the second radio network node 13, the processing circuitry 1001, and/or the transmitting module 1003 may be configured to detect that the wireless device 10 has not been able to successfully decode the RAR, for example, by detecting that no handover complete message (or other message) was received in the UL resources allocated by the UL grant in the second RAR, the second radio network node 13, the processing circuitry 1001, and/or the receiving module 1002 may be configured to monitor its PRACH resources associated with wide beam transmissions, such as based on the TSS according to the configuration provided to the wireless device 10.

The second radio network node 13 further comprises a memory 1004. The memory comprises one or more units to be used to store data on, such as RSs, strengths or qualities, RAR reception windows, RACH information, preambles, commands, applications to perform the methods disclosed herein when being executed, and similar.

The methods according to the embodiments described herein for the second radio network node 13 are respectively implemented by means of e.g. a computer program product 1005 e.g. a computer program, comprising instructions, i.e., software code portions, which, when executed on at least one processor, cause the at least one processor to carry out the actions described herein, as performed by the second radio network node 13. The computer program product 1005 may be stored on a computer-readable storage medium 1006, e.g. a USB stick, a disc or similar. The computer-readable storage medium 1006, having stored thereon the computer program product, may comprise the instructions which, when executed on at least one processor, cause the at least one processor to carry out the actions described herein, as performed by the second radio network node 13. In some embodiments, the computer-readable storage medium may be a non-transitory computer-readable storage medium. Thus, the second radio network node 13 may comprise the processing circuitry and the memory, said memory comprising instructions executable by said processing circuitry whereby said radio network node is operative to perform the methods herein.

Figure 11:
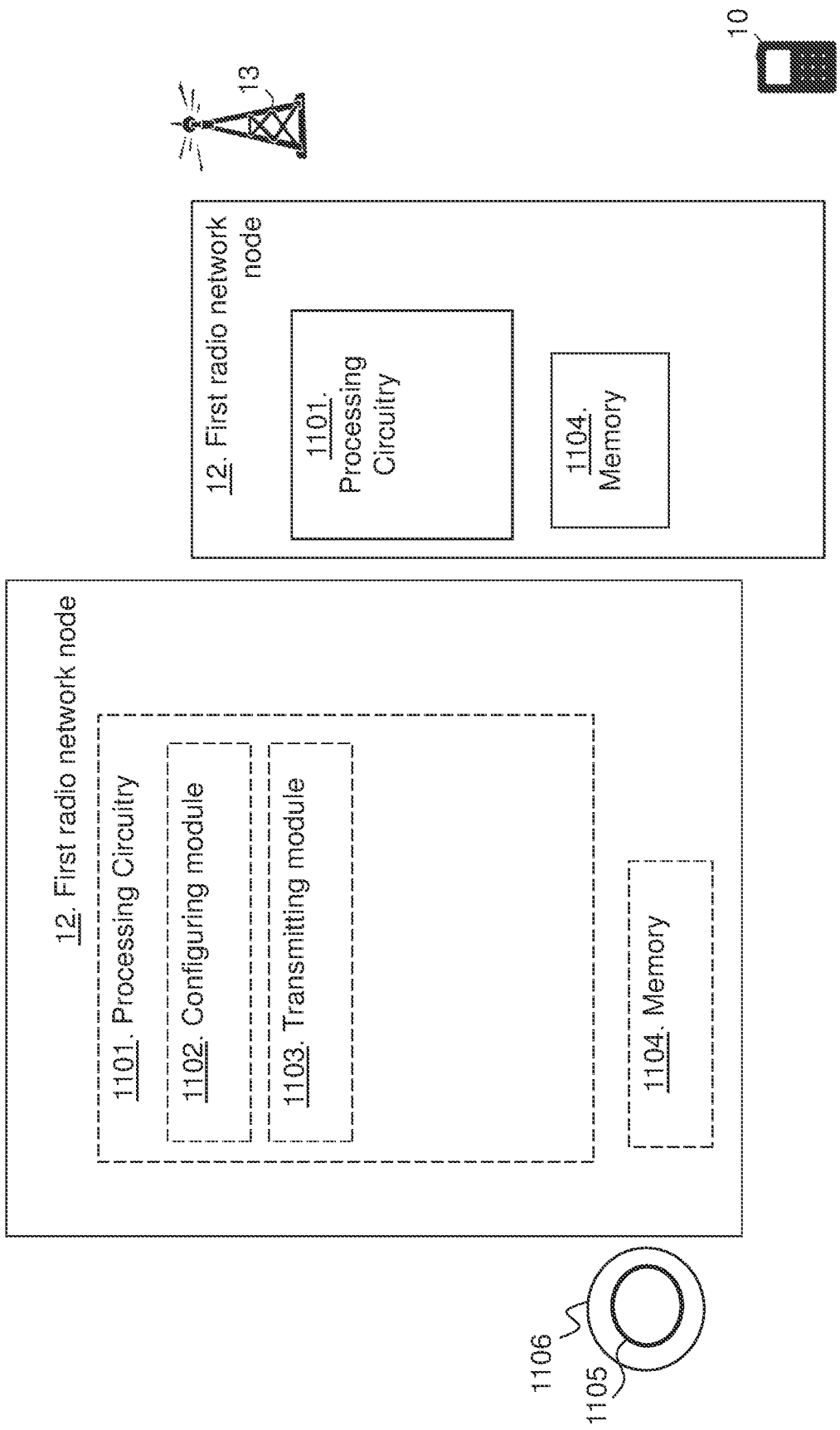
FIG. 11 is a schematic block diagram depicting a wireless device according to embodiments herein.

FIG. 11 is a block diagram depicting the first radio network node 12, in two embodiments, for handling communication in the wireless communication network 1 according to embodiments herein. The first radio network node 12 may be configured to serve the wireless device by providing radio coverage over the first service area 11 or beam using the first reference signal for identifying the first service area 11 in the wireless communication network 1. The second radio network node 13 is configured to provide radio coverage over the second service area 14 using the second reference signal for identifying the second service area 14 in the wireless communication network 1.

The first radio network node 12 may comprise a processing unit 1101, e.g. one or more processors, configured to perform the methods herein.

The first radio network node 12 may comprise a receiving module 1102. The first radio network node 12, the processing unit 1101, and/or the receiving module 1102 is configured to receive configuration data from the second radio network node or a target cell.

The first radio network node 12 may comprise a transmitting module 1103. The first radio network node 12, the processing unit 1101, and/or the transmitting module 1003 is configured to transmit the configuration data to the wireless device informing the wireless device of RACH information of the beams of the second radio network node 13.

The first radio network node 12 further comprises a memory 1104. The memory comprises one or more units to be used to store data on, such as RACH information, RAR windows, RSs, applications to perform the methods disclosed herein when being executed, and similar.

The methods according to the embodiments described herein for first radio network node 12 are respectively implemented by means of e.g. a computer program product 1105 e.g. a computer program, comprising instructions, i.e., software code portions, which, when executed on at least one processor, cause the at least one processor to carry out the actions described herein, as performed by the first radio network node 12. The computer program product 1105 may be stored on a computer-readable storage medium 1106, e.g. a USB stick, a disc or similar. The computer-readable storage medium 1106, having stored thereon the computer program product, may comprise the instructions which, when executed on at least one processor, cause the at least one processor to carry out the actions described herein, as performed by the first radio network node 12. In some embodiments, the computer-readable storage medium may be a non-transitory computer-readable storage medium. Thus, the first radio network node 12 may comprise the processing circuitry and the memory, said memory comprising instructions executable by said processing circuitry whereby said radio network node is operative to perform the methods herein.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in Mobility measurement beams. Thus, while the term "MRS" is used herein to refer a signal used herein, the term "MRS"

is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

Figure 12:
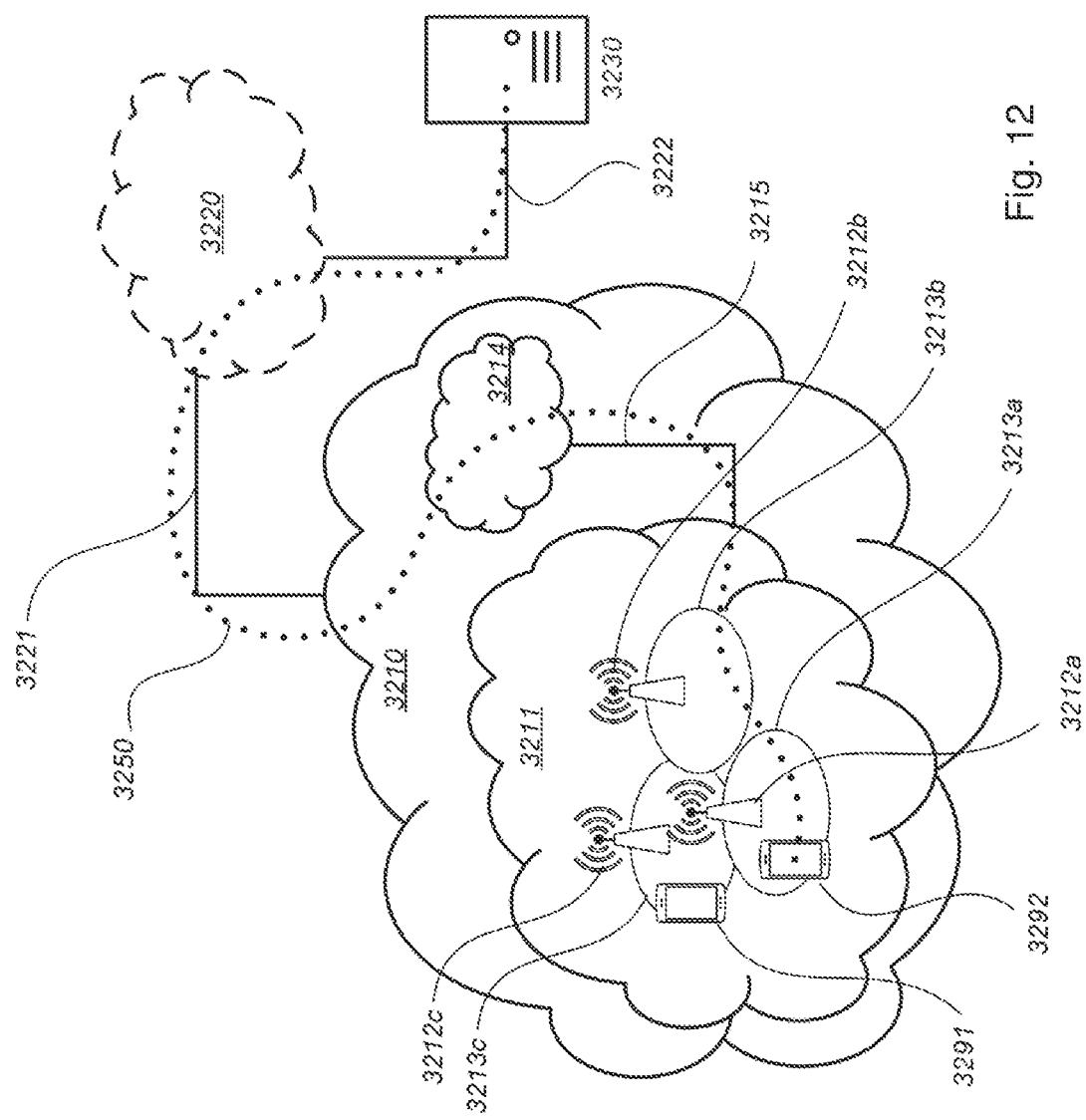
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
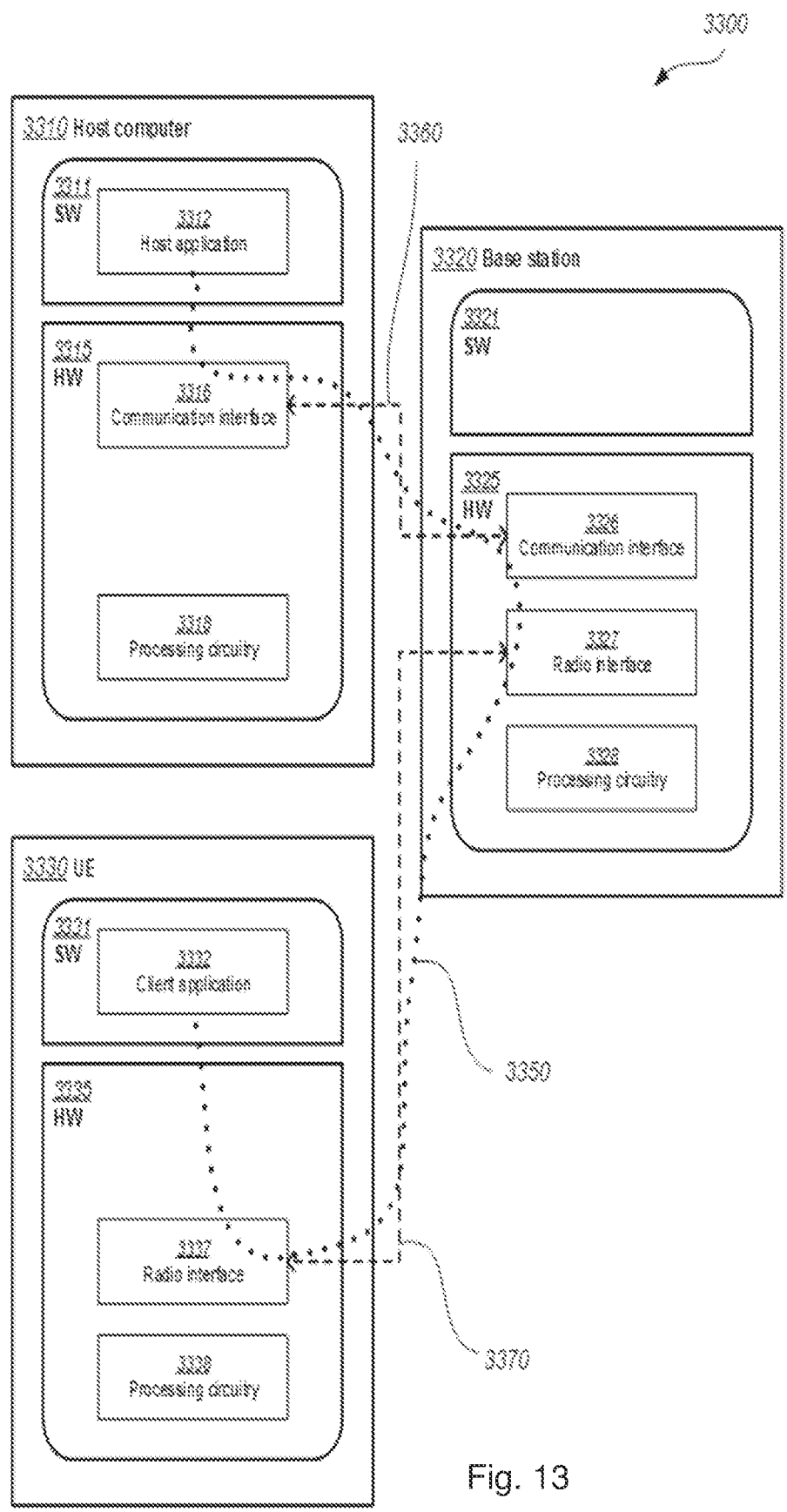
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency since the second or different beam is quickly accessed and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It is herein disclosed a method performed by a wireless device for handling communication such as handling handover, in a wireless communication network. The wireless device is configured to transmit a first preamble in accordance with a RACH configuration associated with a selected narrow DL beam. The wireless device waits for a RAR in a (configured) first RAR reception window. If the RAR is received the wireless device 10 proceeds with the network access procedure. In case the RAR in the first RAR reception window is not received, the wireless device, waits for a RAR in a second RAR reception window of a wide(r) beam. If the wireless device receives a RAR in the second RAR reception window, the wireless device proceeds with the network access procedure. In case the wireless device does not receive any RAR in the second RAR reception window, the wireless device may transmit a second RACH preamble associated with a wide beam. In case no RAR is received after the second RACH preamble the wireless device may transmit a third preamble in accordance with a RACH configuration of a newly selected wide beam.

It is further herein disclosed a method performed by a radio network node for handling communication of a wireless device in a wireless communication network. The radio network node, e.g. a second radio network node, receives a first preamble associated with a narrow DL beam transmission and transmits a RAR with the narrow DL beam associated with the first preamble. The radio network node monitors whether the wireless device has successfully received the RAR and determines that the wireless device 10 may not have been able to decode the RAR, the second radio network node sends the RAR a second time but over a wide beam. The wide DL beam that is selected by the second radio network node 13 covers the narrow DL beam the wireless device has initially selected.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

ACK Acknowledged
ADC Analog-to-digital conversion
AGC Automatic gain control
ANR Automatic neighbor relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signaling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink

The invention claimed is:

1. A method of operating a network node in a wireless communication network, the method comprising:
   receiving a first preamble associated with a first downlink ("DL") beam from a wireless device in the wireless communication network;
   transmitting a random access response ("RAR") to the wireless device;
   responsive to transmitting the RAR, determining that the wireless device has not received the RAR; and
   responsive to determining that the wireless device has not received the RAR, transmitting the RAR using a second DL beam.

2. The method of claim 1, wherein the second DL beam covers the first DL beam.

3. The method of claim 1, further comprising:
   responsive to transmitting the RAR using the second DL beam, receiving a second preamble associated with a third DL beam from the wireless device,
   wherein the first preamble is associated with a channel state information reference signal and the second preamble is associated with a synchronization signal block.

4. The method of claim 3, wherein the second DL beam and the third DL beam are wider than the first DL beam.

5. The method of claim 3, wherein transmitting the RAR comprises transmitting the RAR using the first DL beam during a first RAR reception window, the first DL beam having been selected by the wireless device,
   wherein transmitting the RAR using the second DL beam comprises transmitting the RAR using the second DL beam during a second RAR reception window, and
   wherein the second RAR reception window is an extension of the first RAR reception window.

6. The method of claim 5, wherein determining that the wireless device has not received the RAR comprises determining that the network node has not received a subsequent message related to the RAR from the wireless device during a period of time associated with the first RAR reception window.

7. The method of claim 5, wherein receiving the second preamble comprises, responsive to determining that the RAR has not been received during the second RAR reception window, receiving the second preamble associated with the third DL beam, the method further comprising:
   responsive to receiving the second preamble, transmitting a RAR associated with the second preamble during a third RAR reception window;
   determining that the wireless device has not received the RAR associated with the second preamble during the third RAR reception window; and
   responsive to determining that the wireless device has not received the RAR associated with the second preamble during the third RAR reception window, receiving a third preamble associated with a fourth DL beam, the fourth DL beam having been selected by the wireless device.

8. The method of claim 7, further comprising:
   responsive to a RAR associated with the third preamble not being received during a fourth RAR reception window, performing power ramping procedures based on system information.

9. The method of claim 1, further comprising:
   transmitting a radio resource control ("RRC") connection reconfiguration message including a random access channel ("RACH") mapping configuration to the wireless device, wherein the first DL beam and the second DL are associated with the RACH mapping configurations.

10. A network node configured to operate in a wireless communication network, the network node comprising:
    processing circuitry; and
    memory coupled to the processing circuitry and having instructions stored therein that are executable by the processing circuitry to cause the network node to perform operations comprising:
       receiving a first preamble associated with a first downlink ("DL") beam from a wireless device in the wireless communication network;
       transmitting a random access response ("RAR") to the wireless device;
       responsive to transmitting the RAR, determining that the wireless device has not received the RAR; and
       responsive to determining that the wireless device has not received the RAR, transmitting the RAR using a second DL beam.

11. The network node of claim 10, wherein the second DL beam covers the first DL beam.

12. The network node of claim 10, the operations further comprising:

responsive to transmitting the RAR using the second DL beam, receiving a second preamble associated with a third DL beam from the wireless device, wherein the first preamble is associated with a channel state information reference signal and the second preamble is associated with a synchronization signal block.

13. The network node of claim 12, wherein the second DL beam and the third DL beam are wider than the first DL beam.

14. The network node of claim 12, wherein transmitting the RAR comprises transmitting the RAR using the first DL beam during a first RAR reception window, the first DL beam having been selected by the wireless device,
wherein transmitting the RAR using the second DL beam comprises transmitting the RAR using the second DL beam during a second RAR reception window, and
wherein the second RAR reception window is an extension of the first RAR reception window.

15. The network node of claim 14, wherein determining that the wireless device has not received the RAR comprises determining that the network node has not received a subsequent message related to the RAR from the wireless device during a period of time associated with the first RAR reception window.

16. The network node of claim 14, wherein receiving the second preamble comprises, responsive to determining that the RAR has not been received during the second RAR reception window, receiving the second preamble associated with the third DL beam, the operations further comprising:
responsive to receiving the second preamble, transmitting a RAR associated with the second preamble during a third RAR reception window;
determining that the wireless device has not received the RAR associated with the second preamble during the third RAR reception window; and
responsive to determining that the wireless device has not received the RAR associated with the second preamble during the third RAR reception window, receiving a third preamble associated with a fourth DL beam, the fourth DL beam having been selected by the wireless device.

17. The network node of claim 16, the operations further comprising:
responsive to a RAR associated with the third preamble not being received during a fourth RAR reception window, performing power ramping procedures based on system information.

18. The network node of claim 10, the operations further comprising: transmitting a radio resource control ("RRC") connection reconfiguration message including a random access channel ("RACH") mapping configuration to the wireless device, wherein the first DL beam and the second DL are associated with the RACH mapping configurations.

19. A non-transitory computer-readable medium having instructions stored therein that are executable by processing circuitry of a network node in a wireless communication network to cause the network node to perform operations, the operations comprising:
receiving a first preamble associated with a first downlink ("DL") beam from a wireless device in the wireless communication network;
transmitting a random access response ("RAR") to the wireless device;
responsive to transmitting the RAR, determining that the wireless device has not received the RAR; and
responsive to determining that the wireless device has not received the RAR, transmitting the RAR using a second DL beam.

20. The non-transitory computer-readable medium of claim 19, wherein the second DL beam covers the first DL beam.

* * * * *

UNITED STATES PATENT AND TRADEMARK OFFICE
CERTIFICATE OF CORRECTION

| | |
|---|---|
| PATENT NO. | : 11,570,669 B2 |
| APPLICATION NO. | : 17/108637 |
| DATED | : January 31, 2023 |
| INVENTOR(S) | : Da Silva et al. |

It is certified that error appears in the above-identified patent and that said Letters Patent is hereby corrected as shown below:

On the Title Page

In Item (54), in Title, in Column 1, Line 2, delete "METHODS FOR PERFORMED" and insert -- METHODS PERFORMED --, therefor.

On Page 2, in Item (56), under "OTHER PUBLICATIONS", in Column 2, Line 11, delete "WG2 #98," and insert -- WG2 Meeting #98, --, therefor.

On Page 2, in Item (56), under "OTHER PUBLICATIONS", in Column 2, Line 14, delete "WGI meeting" and insert -- WG1 Meeting --, therefor.

In the Drawings

In Fig. 16, Sheet 18 of 18, for Step "3610", in Line 3, delete "provided at" and insert -- provided by --, therefor.

In the Specification

In Column 1, in Title, Line 2, delete "METHODS FOR PERFORMED" and insert -- METHODS PERFORMED --, therefor.

In Column 1, Line 10, delete "filed Oct. 16, 2019," and insert -- filed on Oct. 16, 2019, now Pat. No. 10,887,803, --, therefor.

In Column 2, Lines 41-42, delete "decisions whether" and insert -- decisions on whether --, therefor.

In Column 3, Line 34, delete "denoted" and insert -- denoted as --, therefor.

In Column 3, Line 38, delete "denoted" and insert -- denoted as --, therefor.

Signed and Sealed this
Fourth Day of July, 2023

*Katherine Kelly Vidal*

Katherine Kelly Vidal
*Director of the United States Patent and Trademark Office*

CERTIFICATE OF CORRECTION (continued)
U.S. Pat. No. 11,570,669 B2

In Column 8, Line 28, delete "(WiMax)," and insert -- (WiMAX), --, therefor.

In Column 15, Line 5, delete "wireless device has" and insert -- wireless device 10 has --, therefor.

In Column 17, Line 64, delete "wireless device that" and insert -- wireless device 10 that --, therefor.

In Column 19, Line 34, delete "previously selection" and insert -- previously selected --, therefor.

In Column 21, Line 34, delete "is enable" and insert -- is enabled --, therefor.

In Column 23, Line 37, delete "in in the" and insert -- in the --, therefor.

In Column 25, Line 66, delete "transmitting module 1003" and insert -- transmitting module 1103 --, therefor.

In Column 26, Lines 44-45, delete "Mobility Switching Centre (MSC), Mobile Management Entity (MME) etc," and insert -- Mobile Switching Centre (MSC), Mobility Management Entity (MME) etc., --, therefor.

In Column 26, Line 48, delete "Minimizing Drive Test (MDT)" and insert -- Minimization of Drive Test (MDT) --, therefor.

In Column 26, Line 57, delete "laptop embedded equipped (LEE)," and insert -- laptop embedded equipment (LEE), --, therefor.

In Column 26, Line 67, delete "refer a" and insert -- refer to a --, therefor.

In Column 27, Line 8, delete "used common" and insert -- used commonly --, therefor.

In Column 30, Line 27, delete "in that" and insert -- such that --, therefor.

In Column 31, Line 16, delete "substep" and insert -- step --, therefor.

In Column 32, Line 59, delete "NACK Not acknowledged" and insert -- NACK Negative Acknowledgment --, therefor.

In Column 33, Line 19, delete "RSSI Received signal strength indication" and insert -- RSSI Received signal strength indicator --, therefor.

In the Claims

In Column 35, Lines 3-6, in Claim 12, delete "wherein the . . . . . block." and insert the same at Line 4, as a new subpoint.